United States Patent
Zhang et al.

(10) Patent No.: US 11,932,799 B2
(45) Date of Patent: Mar. 19, 2024

(54) LIQUID CRYSTAL MIXTURE AND LIGHT MODULATING DEVICE

(71) Applicant: Smart Liquid Crystal Technologies Co., Ltd., Suzhou (CN)

(72) Inventors: Hongwei Zhang, Suzhou (CN); Hui Xu, Suzhou (CN); Li Zhang, Suzhou (CN); Ximei Shen, Suzhou (CN); Jianhua Tang, Suzhou (CN)

(73) Assignee: Smart Liquid Crystal Technologies Co., Ltd., Suzhou (CN)

( * ) Notice: Subject to any disclaimer, the term of this patent is extended or adjusted under 35 U.S.C. 154(b) by 52 days.

(21) Appl. No.: 17/626,182

(22) PCT Filed: Aug. 5, 2020

(86) PCT No.: PCT/CN2020/107016
§ 371 (c)(1),
(2) Date: Jan. 11, 2022

(87) PCT Pub. No.: WO2021/042931
PCT Pub. Date: Mar. 11, 2021

(65) Prior Publication Data
US 2022/0282159 A1 Sep. 8, 2022

(30) Foreign Application Priority Data
Sep. 4, 2019 (CN) .......................... 201910832491.9

(51) Int. Cl.
G02F 1/1333 (2006.01)
C09K 19/30 (2006.01)
C09K 19/32 (2006.01)
C09K 19/44 (2006.01)
C09K 19/58 (2006.01)
C09K 19/04 (2006.01)
C09K 19/12 (2006.01)
C09K 19/34 (2006.01)
G02F 1/137 (2006.01)

(52) U.S. Cl.
CPC .......... *C09K 19/44* (2013.01); *C09K 19/3003* (2013.01); *C09K 19/322* (2013.01); *C09K 19/586* (2013.01); *C09K 2019/0459* (2013.01); *C09K 2019/0466* (2013.01); *C09K 2019/122* (2013.01); *C09K 2019/123* (2013.01); *C09K 2019/3004* (2013.01); *C09K 2019/3009* (2013.01); *C09K 2019/301* (2013.01); *C09K 2019/3016* (2013.01); *C09K 2019/323* (2013.01); *C09K 2019/3422* (2013.01); *G02F 1/13718* (2013.01)

(58) Field of Classification Search
CPC .. C09K 19/44; C09K 19/3003; C09K 19/322; C09K 19/586; C09K 2019/0459; C09K 2019/0466; C09K 2019/122; C09K 2019/123; C09K 2019/3004; C09K 2019/3009; C09K 2019/301; C09K 2019/3016; C09K 2019/323; C09K 2019/3422; C09K 2019/0444; C09K 2019/124; C09K 2019/2035; C09K 2019/3019; G02F 1/1333; G02F 1/13718
See application file for complete search history.

(56) References Cited

U.S. PATENT DOCUMENTS

| | | | |
|---|---|---|---|
| 10,087,370 | B2 | 10/2018 | Tuffin et al. |
| 2006/0027784 | A1 | 2/2006 | Francis et al. |
| 2008/0142758 | A1 | 6/2008 | Golding et al. |
| 2014/0232977 | A1 | 8/2014 | Adlem et al. |
| 2017/0342324 | A1 | 11/2017 | Adlem et al. |
| 2017/0351130 | A1 | 12/2017 | Gorecki et al. |
| 2017/0357131 | A1 | 12/2017 | Chen et al. |
| 2018/0004045 | A1 | 1/2018 | Chen et al. |
| 2019/0292457 | A1 | 9/2019 | Fierbanz et al. |
| 2021/0198575 | A1 | 7/2021 | Zhang et al. |
| 2022/0282159 | A1 * | 9/2022 | Zhang ................. C09K 19/586 |

FOREIGN PATENT DOCUMENTS

| | | | | |
|---|---|---|---|---|
| CN | 103619992 | A | | 3/2014 |
| CN | 104321410 | A | | 1/2015 |
| CN | 106281355 | * | 1/2017 | ............ C09K 19/44 |
| CN | 107003578 | A | | 8/2017 |
| CN | 107109222 | A | | 8/2017 |

(Continued)

OTHER PUBLICATIONS

Machine translation of CN106281355 (Year: 2017).*

*Primary Examiner* — Geraldina Visconti

(74) *Attorney, Agent, or Firm* — Hoffmann & Baron, LLP

(57) ABSTRACT

Disclosed herein is a liquid crystal mixture applied in light modulating devices, comprising: component A comprised of one or more compounds selected from the group of compounds of formula (I), component B comprised of one or more compounds selected from the group of compounds of formula (II), and component C comprised of one or more chiral compounds. Also disclosed is a light modulating device containing the liquid crystal mixture, wherein the liquid crystal mixture has higher stability of electrical performance and the light modulating device has improved optical performance.

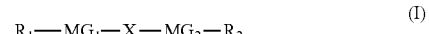
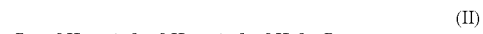

15 Claims, 3 Drawing Sheets

(56) References Cited

FOREIGN PATENT DOCUMENTS

| | | | |
|---|---|---|---|
| CN | 107209422 | A | 9/2017 |
| CN | 107209426 | A | 9/2017 |
| CN | 109154753 | A | 1/2019 |
| CN | 109825309 | A | 5/2019 |
| EP | 1477547 | A1 | 11/2004 |
| GB | 2356629 | A | 5/2001 |
| WO | 2004/053022 | A1 | 6/2004 |
| WO | 2016/096076 | A1 | 6/2016 |
| WO | 2016/116124 | A1 | 7/2016 |
| WO | 2017/001043 | A1 | 1/2017 |
| WO | 2018104279 | A1 | 6/2018 |
| WO | 2019/101060 | A1 | 5/2019 |

\* cited by examiner

LIQUID CRYSTAL MIXTURE AND LIGHT MODULATING DEVICE

CROSS-REFERENCE TO RELATED APPLICATIONS

This application is the National Stage of International Application No. PCT/CN2020/107016, filed Aug. 5, 2020, which claims the benefit of Chinese Application No. 201910832491.9, filed Sep. 4, 2019, the contents of which is incorporated by reference herein.

TECHNICAL FIELD

The present invention relates to liquid crystals and devices using the same, and more particularly, to a liquid crystal mixture and a light modulating device comprising the liquid crystal mixture.

BACKGROUND OF THE INVENTION

As a device exploiting the electro-optic effect, a liquid-crystal-based light modulating device is mainly comprised of transparent conductive substrates and liquid crystal materials, where the orientation of liquid crystal molecules may be manipulated by applying an external electric field to switch between different optical states. Because of their unique characteristics, liquid-crystal-based light modulating devices are used in a wide range of applications, such as building materials, home decoration devices, automotive displays, and consuming electronic devices etc., for the realization of privacy, beautification and energy-saving functions. Among them, a bistable or multi-stable light modulating device is highly desirable due to its energy-saving and fail-safe features.

A bistable light modulating device based on cholesteric liquid crystals generally has two zero-electric-field-stable states: a transparent state and a light scattering state. Due to its angular-independent high transparency in the transparent state and high haze in the light scattering state, the bistable cholesteric liquid crystal light modulating device has therefore very high market potential as a light modulation device in consumer electronics and as a building material. Generally, in this kind device, cholesteric liquid crystals form a periodic spiral texture which is highly affected by the surface condition and external environment of the device. During application, the liquid crystal materials may become unstable due to the external environment conditions, such as long-time-exposure to light, temperature changing, exposure to moisture and others, which cause the distribution of electron clouds of the liquid crystal molecules become abnormal. As a result, the electro-optic performance of the light modulating device is changed and the entire uniformity of the optical performance is decreased, which not only affects the product appearance but also causes loss of the privacy, and ultimately limiting the further application of the light modulating device.

Therefore, there remains a need for a liquid crystal mixture whose stability can be increased while the light modulating device comprise the liquid crystal mixture can maintain a high haze in the light scattering state and a low haze in the transparent state, thereby improving the stability of the electro-optic performance of the device.

SUMMARY OF THE INVENTION

In order to overcome the above issues, one objective of the present invention is to provide a liquid crystal mixture applied in light modulating devices, comprising:

component A comprised of one or more compound selected from the group of compounds of formula I $$R_1\text{-}MG_1\text{-}X\text{-}MG_2\text{-}R_2 \quad\quad\quad\quad\quad\quad\quad\quad\quad\quad I;$$

component B comprised of one or more compounds selected from the group of compounds of formula II

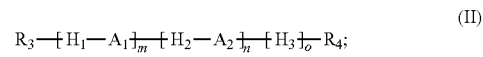

and component C comprised of one or more chiral compounds, wherein $R_1$, $R_2$, $R_3$ and $R_4$ each independently denote —H, —F, —Cl or a chain alkyl group with 1 to 25 C atoms where one or more H atom may be independently substituted by halogen and one or more nonadjacent —$CH_2$— may be independently replaced by —O—, —CH=CH—, —CH=CF— or —CF=CF—, $MG_1$ and $MG_2$ each independently denote a mesogenic group, X is a straight-chain or branched alkyl group with 3-40 C atoms where one or more —$CH_2$— may be independently replaced by —O—, —CH(F)—, —CH(Cl)— or —CH=CH— in such a manner that no two —O— or double bonds are adjacent to one another, $H_1$, $H_2$ and $H_3$ each independently denote a ring structure selected from the group of

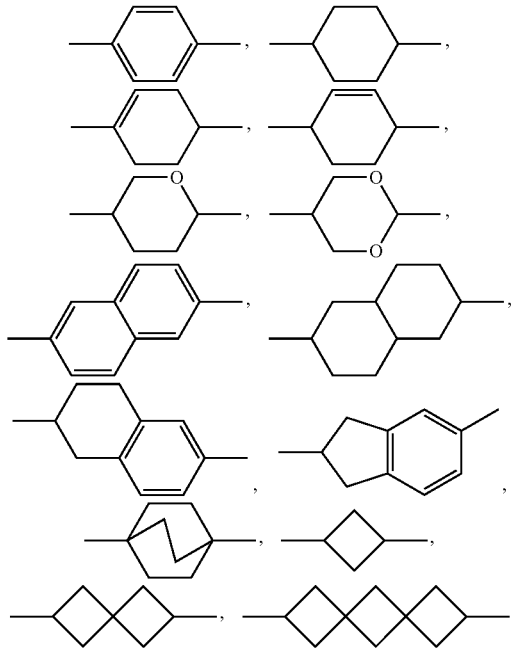

and their mirror structures where one or more H atoms may be independently substituted by halogen or a alkyl group with 1-10 C atoms, $A_1$ and $A_2$ each independently denote —$CF_2O$—, —$OCF_2$—, —$CH_2O$—, —$OCH_2$—, —CH=CH—, —$CF_2CF_2$—, —CF=CF—, —CH=CF—, a single bond or —$(CH_2)_a$— where a is an even number between 2-10, m is 0, 1 or 2, n is 1, 2 or 3, o is 1 or 2, and m+n+o is no more than 5.

In order to modify the entire performance of the liquid crystal mixture, such as optical anisotropy, operating temperature range, solubility, elastic coefficient, viscosity coefficient and etc., the content of the component B in the liquid crystal mixture should not be too low. In a preferred embodiment, the component B is more than 40% by weight of the liquid crystal mixture. In a more preferred embodiment, the component B is 40%-95% by weight of the liquid crystal mixture.

The chiral compounds can induce the spiral twisting of nematic liquid crystal molecules, forming chiral nematic liquid crystal (cholesteric liquid crystal). In a preferred embodiment, the chiral compound is selected from the group of:

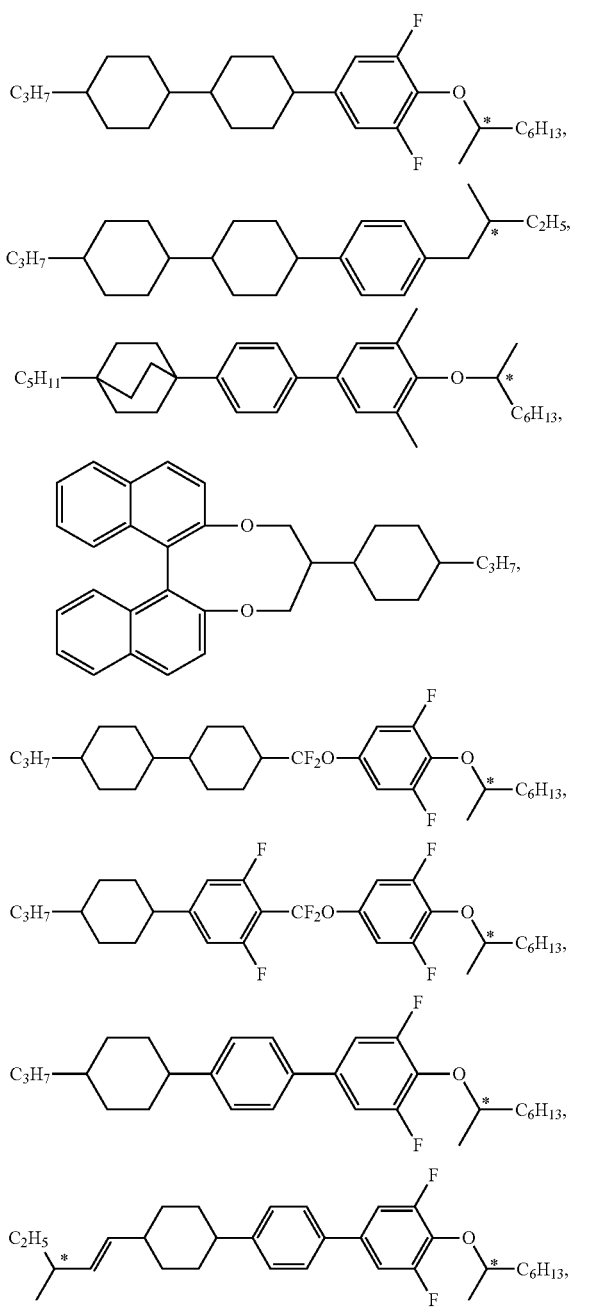

-continued

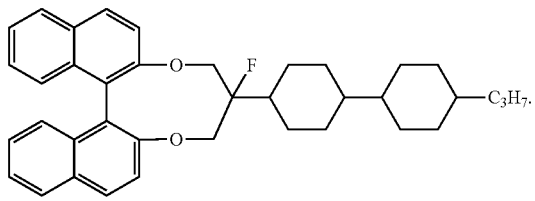

In some preferred embodiments, the mesogenic group is selected from the group of formula III $$\mathrm{-\!\!-\!\!H_4\!\!-\!\!\!+\!\!A_3\!\!-\!\!H_5\!\!\!+\!\!_p\!\!+\!\!A_4\!\!-\!\!H_6\!\!\!+\!\!_q\!\!A_5\!\!-\!\!H_7\!\!-\!\!\!-}$$
III wherein, $H_4$, $H_5$, $H_6$ and $H_7$ each independently denote a ring structure selected from the group of and their mirror structures, wherein one or more H atoms of the ring structures may be independently substituted by halogen or a chain alkyl group with 1-7 C atoms where one or more nonadjacent —$CH_2$— may be replaced by —O— and one or more H atom may be substituted by F or Cl, $A_3$, $A_4$ and $A_5$ each independently denote —$CF_2O$—, —$OCF_2$—, —$CH_2O$—, —$OCH_2$—, —$CH_2CH_2$—, —$CF_2CF_2$—, —CH=CH—, —CF=CF—, —CH=CF— or a single bond, p and q each independently denote 0 or 1.

In some preferred embodiments, the mesogenic group each independently comprises at least two six-membered rings.

In some preferred embodiments, the mesogenic group is each independently selected from the group of

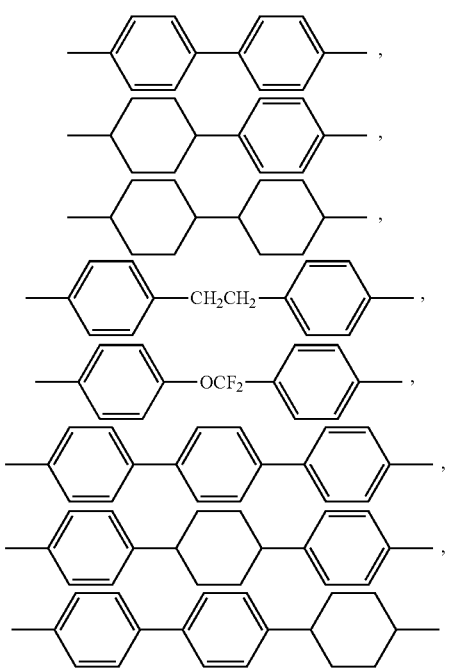

and their mirror structures, wherein 1-4H atoms of the six-membered ring may be independently substituted by F, Cl or a chain alkyl group with 1-7 C atoms where one or more nonadjacent —CH$_2$— may be replaced by —O— and one or more H atom may be substituted by F. In a more preferred embodiment, 1-4H atoms of the six-membered ring may be independently substituted by F, Cl, CH$_3$ or OCH$_3$.

In a preferred embodiment, X is a straight-chain or branched alkyl group with 5-25 C atoms where one or more —CH$_2$— may be independently replaced by —O—, —CH(F)—, —CH(Cl)— or —CH=CH— in such a manner that no two —O— or double bonds are adjacent to one another.

In a more preferred embodiment, X is a straight-chain or branched alkyl group with 5-15 C atoms where one or more —CH$_2$— may be independently replaced by —O—, —CH(F)—, —CH(Cl)— or —CH=CH— in such a manner that no two —O— or double bonds are adjacent to one another.

In some preferred embodiments, X is selected of formula IV $$—Y_1—(CH_2)_s—Y_2—$$  IV where $Y_1$ and $Y_2$ each independently denote —O— or a single bond, and s is an odd number between 3 and 13.

In some preferred embodiments, $R_1$ and $R_2$ each independently denote —H, —F, —Cl, —OCF$_3$, —OCHF$_2$, —CF$_3$ or an unsubstituted chain alkyl or alkoxyl group with 1 to 10 C atoms. In a more preferred embodiment, $R_1$ and $R_2$ each independently denote —F, —Cl, —OCF$_3$ or an unsubstituted chain alkyl or alkoxyl group with 1 to 5 C atoms.

In some preferred embodiments, the compound of formula I is selected from the group of compounds I-1 to I-21:

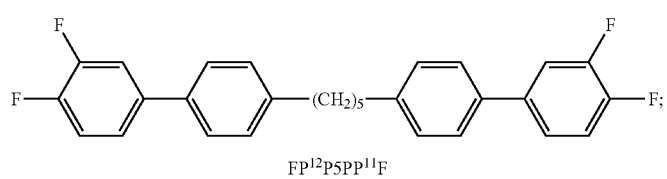

FP$^{12}$P5PP$^{11}$F

I-1

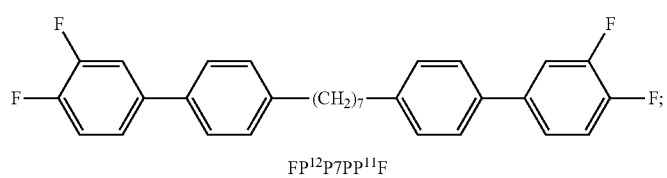

FP$^{12}$P7PP$^{11}$F

I-2

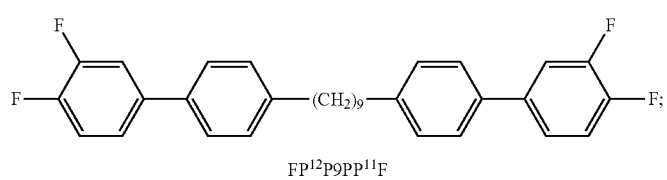

FP$^{12}$P9PP$^{11}$F

I-3

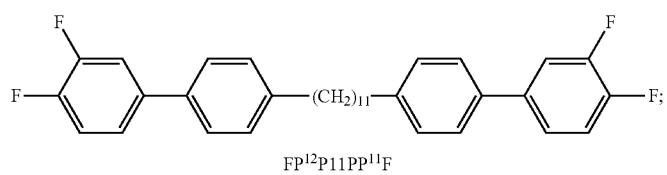

FP$^{12}$P11PP$^{11}$F

I-4

-continued
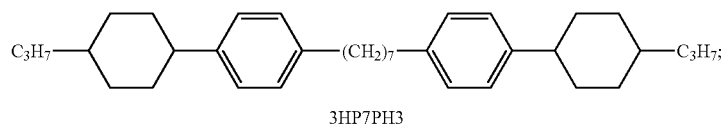
3HP7PH3
I-5
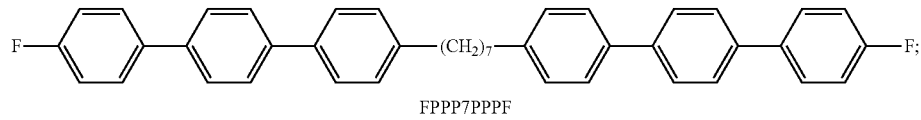
FPPP7PPPF
I-6
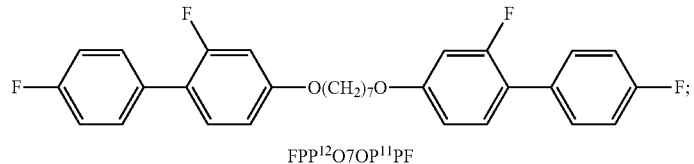
FPP¹²O7OP¹¹PF
I-7
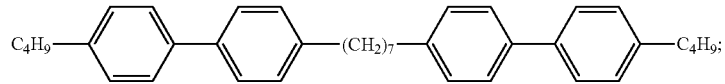
I-8
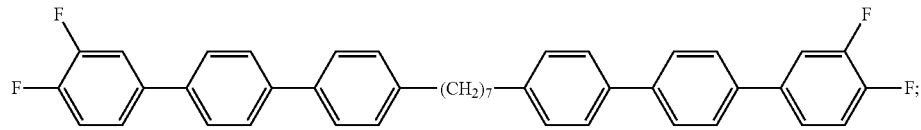
I-9
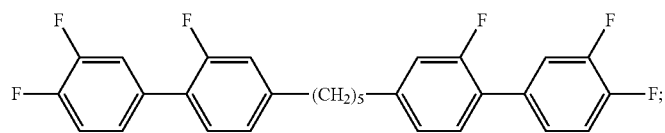
I-10
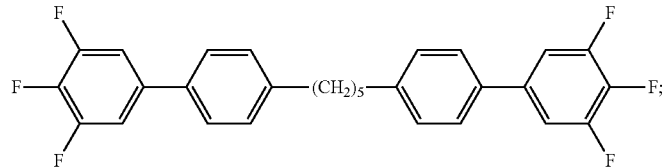
I-11
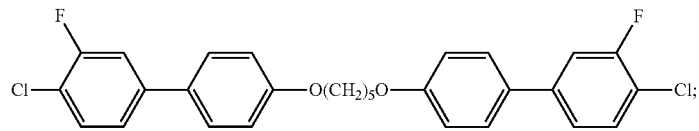
I-12
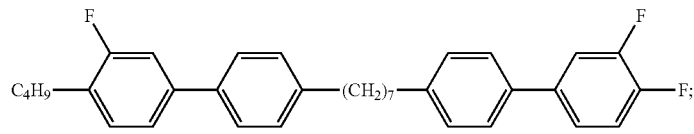
I-13
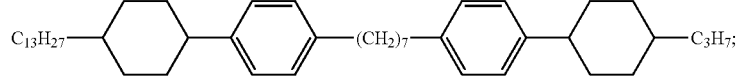
I-14
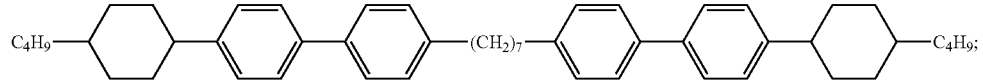
I-15
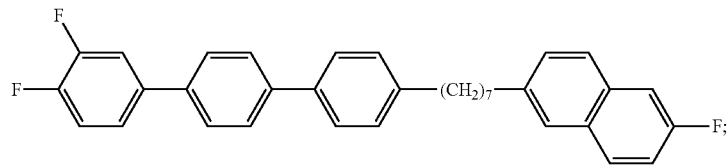
I-16

-continued
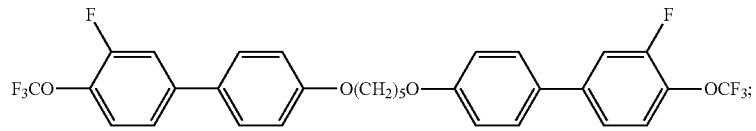
I-17
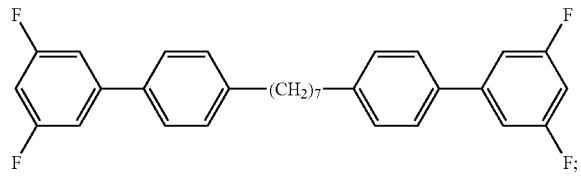
I-18
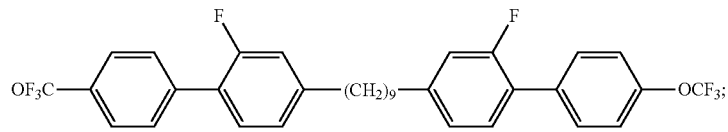
I-19
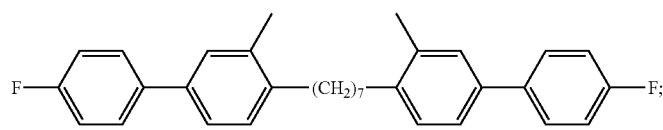
I-20
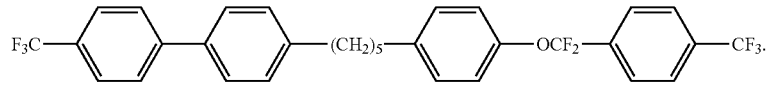
I-21
In some embodiments, the compound of formula I is further selected from the group of compounds I-2 to I-7.
In some preferred embodiments, the compound of formula II is selected from the group of compounds II-1 to II-24:
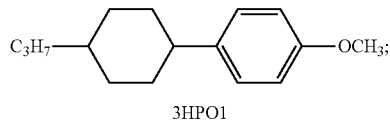
3HPO1
II-1
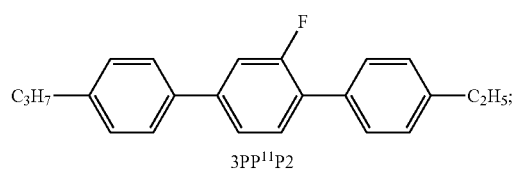
3PP¹¹P2
II-2
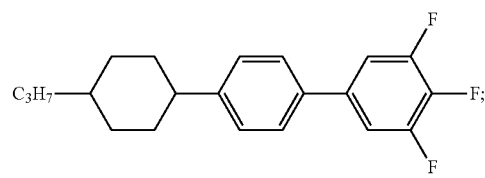
3HPP²¹F
II-3
-continued
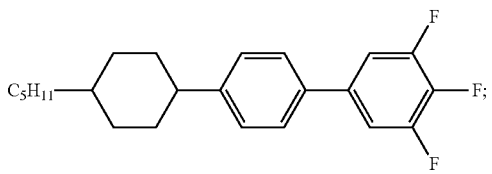
5HPP²¹F
II-4
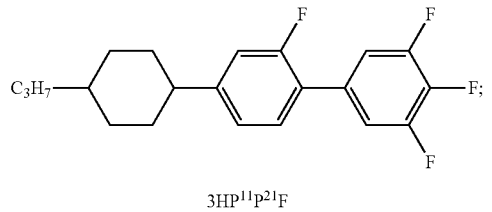
3HP¹¹P²¹F
II-5
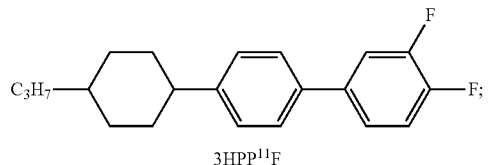
3HPP¹¹F
II-6
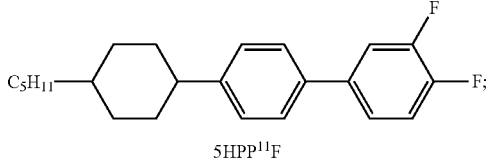
5HPP¹¹F
II-7

II-8
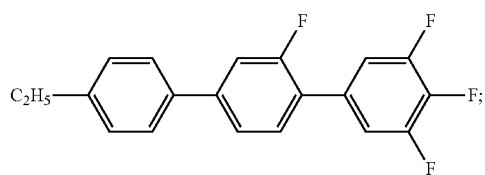
2PP11P21F
II-9
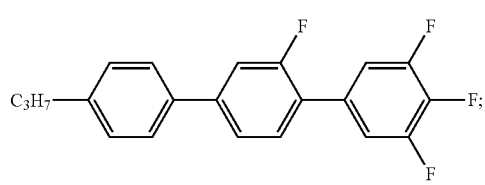
3PP11P21F
II-10
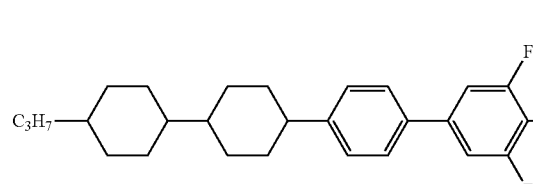
3HHPP21F
II-11
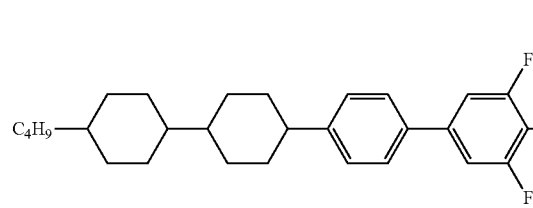
4HHPP21F
II-12
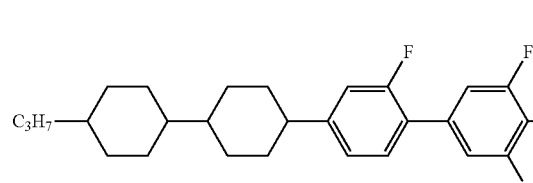
3HHP11P21F
II-13
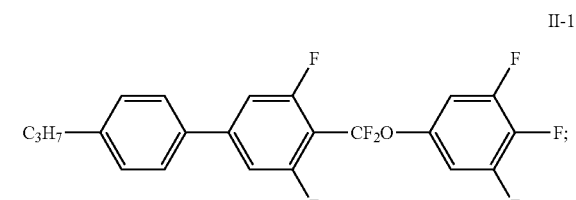
3PP21QP21F
II-14
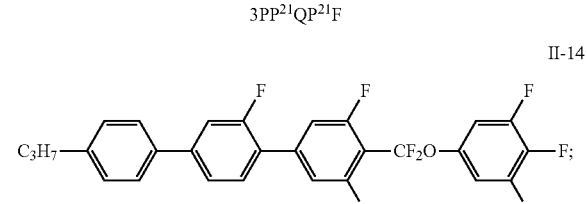
3PP11P21QP21F
II-15
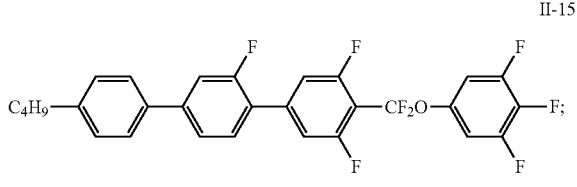
4PP11P21QP21F
II-16
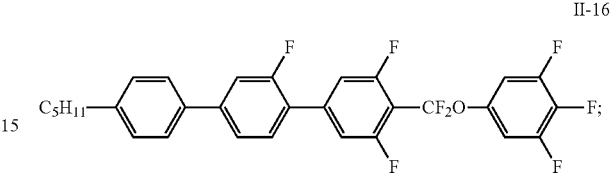
5PP11P21QP21F
II-17
II-18
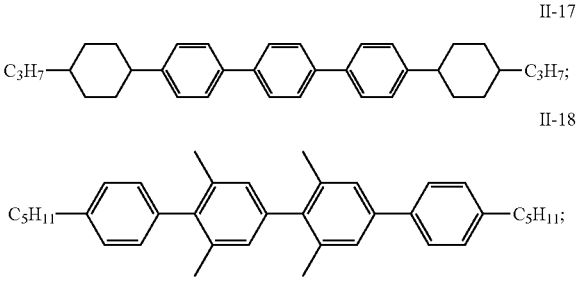
II-19
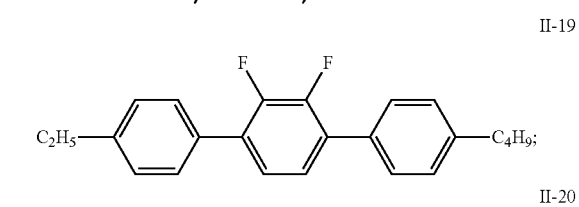
II-20
II-21
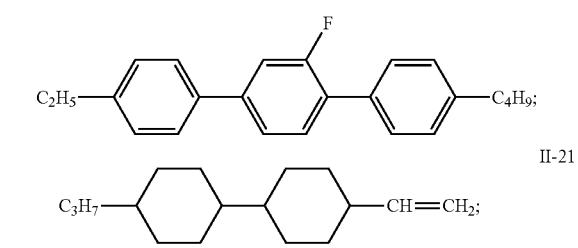
II-22
II-23
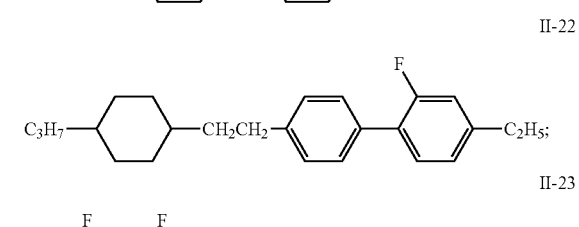
II-24
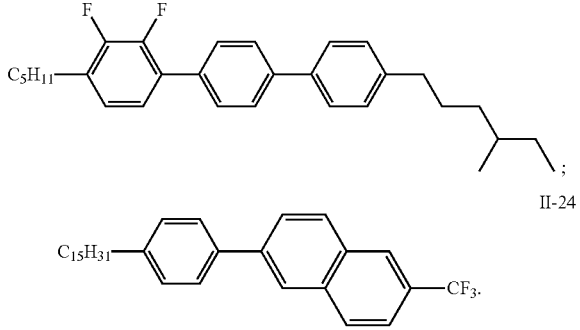

In some embodiments, the compound of formula II is further selected from the group of compounds II-1 to II-16.

Another objective of the present invention is to provide a light modulating device containing the liquid crystal mixture, which includes two stable states: the transparent state where substantially all incident light goes through and the light scattering state where substantially all incident light is scattered.

In some preferred embodiments, the component A is 1%-60% by weight of the liquid crystal mixture. In a more preferred embodiment, the component A is 10%-50% by weight of the liquid crystal mixture.

The invention provides a liquid crystal mixture that may be used in bistable light modulating device by introducing the compounds selected from formula I and II and chiral compounds. The liquid crystal mixture has higher stability of electrical performance, improving the stability of electro-optic performance of the device while the device maintains a high haze in the light scattering state and a low haze in the transparent state, and thus improving the stability of optical performance of the device.

BRIEF DESCRIPTION OF THE DRAWINGS

These and other features and advantages of the present invention will be better understood by reference to the following detailed description of an illustrative embodiment of the present disclosure when read in conjunction with the accompanying drawings, wherein.

DETAILED DESCRIPTION OF THE INVENTION

Figure 1:
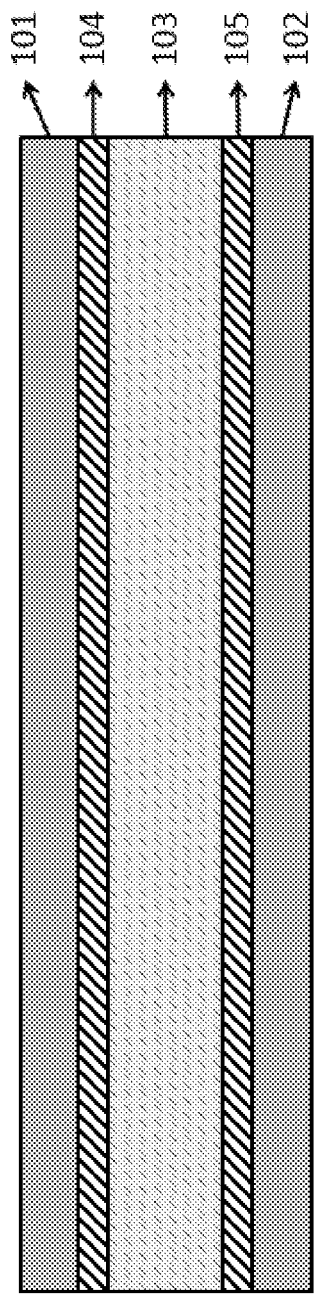
FIG. 1 is a schematic, illustrative view of the structure of the light modulating device according to one embodiment.

The following description of the disclosed embodiments is provided in detail to enable any person skilled in the art to fully understand the present invention. However, it will be apparent to those skilled in the art to readily make or use the present invention without these specific details. In other examples, well-known structures and devices are shown in the block diagram. In this regard, the description of the different illustrative exemplary embodiments presented herein are for the purpose of illustration and description and are not intended to be exhaustive or limited to the inventive concept. Accordingly, the scope of the invention is not to be limited by the specific embodiments described above, and is subject only to the scope of the appended claims.

The present invention discovers a liquid crystal mixture which can be applied in light modulating devices. The liquid crystal mixture comprises: component A comprised of one or more compound selected from the group of compounds of formula I: $R_1\text{-}MG_1\text{-}X\text{-}MG_2\text{-}R_2$; component B comprised of one or more compounds selected from the group of compounds of formula II:

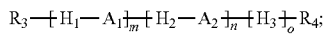

and component C comprised of one or more chiral compounds, wherein $R_1$, $R_2$, $R_3$ and $R_4$ each independently denote —H, —F, —Cl or a chain alkyl group with 1 to 25 C atoms where one or more H atom may be independently substituted by halogen and one or more nonadjacent —$CH_2$— may be independently replaced by —O—, —CH=CH—, —CH=CF— or —CF=CF—; $MG_1$ and $MG_2$ each independently denote a mesogenic group; X is a straight-chain or branched alkyl group with 3-40 C atoms where one or more —$CH_2$— may be independently replaced by —O—, —CH(F)—, —CH(Cl)— or —CH=CH— in such a manner that no two —O— or double bonds are adjacent to one another; $H_1$, $H_2$ and $H_3$ each independently denote a ring structure selected from the group of

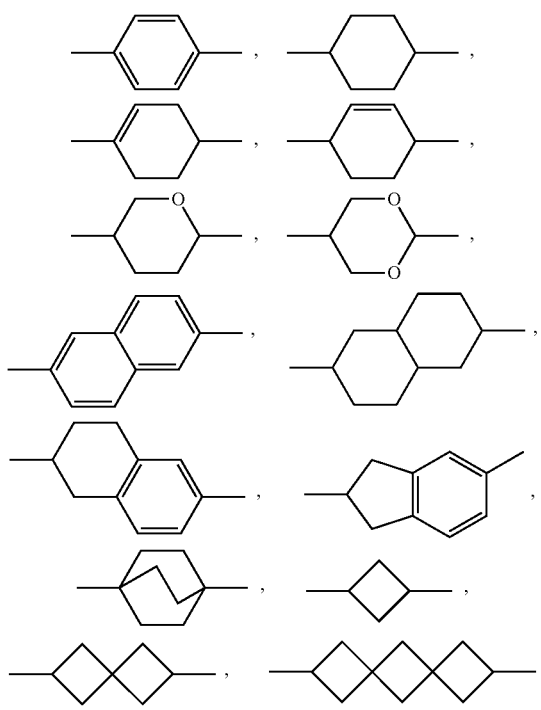

and their mirror structures where one or more H atoms may be independently substituted by halogen or a alkyl group with 1-10 C atoms; $A_1$ and $A_2$ each independently denote —$CF_2O$—, —$OCF_2$—, —$CH_2O$—, —$OCH_2$—, —CH=CH—, —$CF_2CF_2$—, —CF=CF—, —CH=CF—, a single bond or —$(CH_2)_a$— where a is an even number between 2-10; m is 0, 1 or 2, n is 1, 2 or 3, o is 1 or 2, and m+n+o is no more than 5.

The mesogenic group is selected from the group of formula III:

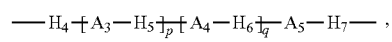

wherein $H_4$, $H_5$, $H_6$ and $H_7$ each independently denote a ring structure selected from the group of

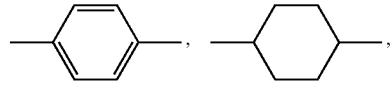

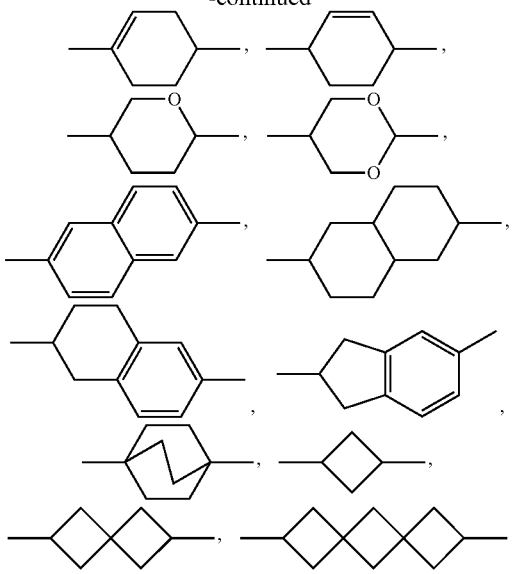

and their mirror structures, wherein one or more H atoms of the ring structures may be independently substituted by halogen or a chain alkyl group with 1-7 C atoms where one or more nonadjacent —CH$_2$— may be replaced by —O— and one or more H atom may be substituted by F or Cl; A$_3$, A$_4$ and A$_5$ each independently denote —CF$_2$O—, —OCF$_2$—, —CH$_2$O—, —OCH$_2$—, —CH$_2$CH$_2$—, —CF$_2$CF$_2$—, —CH=CH—, —CF=CF—, —CH=CF— or a single bond; p and q each independently denote 0 or 1.

Preferably, the mesogenic group each independently comprises at least two six-membered rings. More preferably, the mesogenic group is each independently selected from the group of

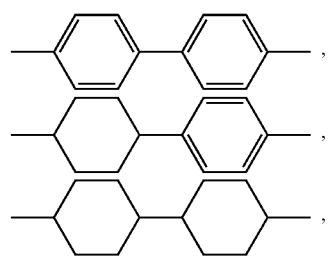

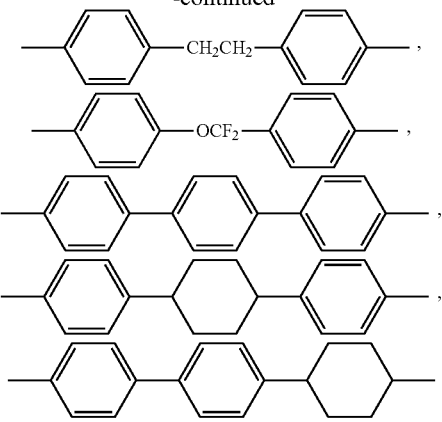

and their mirror structures, wherein 1-4H atoms of the six-membered ring may be independently substituted by F, Cl or a chain alkyl group with 1-7 C atoms where one or more nonadjacent —CH$_2$— may be replaced by —O— and one or more H atom may be substituted by F. More preferably, 1-4H atoms of the six-membered ring may be independently substituted by F, Cl, CH$_3$ or OCH$_3$.

Preferably, X is a straight-chain or branched alkyl group with 5-25 C atoms where one or more —CH$_2$— may be independently replaced by —O—, —CH(F)—, —CH(Cl)— or —CH=CH— in such a manner that no two —O— or double bonds are adjacent to one another. More preferably, X is a straight-chain or branched alkyl group with 5-15 C atoms where one or more —CH$_2$— may be independently replaced by —O—, —CH(F)—, —CH(Cl)— or —CH=CH— in such a manner that no two —O— or double bonds are adjacent to one another. More preferably, X is selected of formula IV:

where Y$_1$ and Y$_2$ each independently denote —O— or a single bond, and s is an odd number between 3 and 13.

Preferably, R$_1$ and R$_2$ each independently denote —H, —F, —Cl, —OCF$_3$, —OCHF$_2$, —CF$_3$ or an unsubstituted chain alkyl or alkoxyl group with 1 to 10 C atoms. More preferably, R$_1$ and R$_2$ each independently denote —F, —Cl, —O—CF$_3$ or an unsubstituted chain alkyl or alkoxyl group with 1 to 5 C atoms.

Preferably, the compound of formula I is selected from the group of compounds I-1 to I-21:

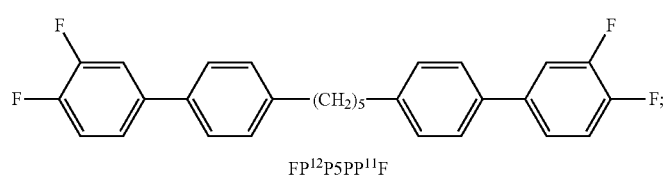

FP$^{12}$P5PP$^{11}$F

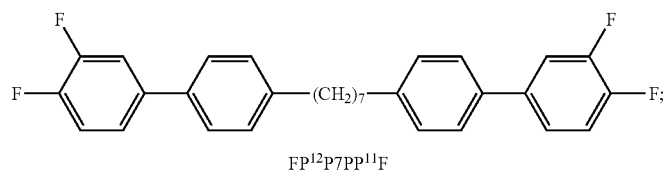

FP$^{12}$P7PP$^{11}$F

-continued
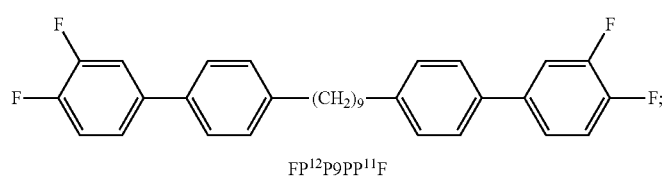
FP¹²P9PP¹¹F
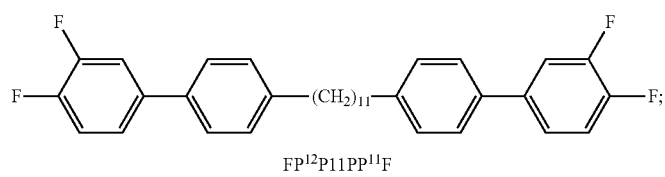
FP¹²P11PP¹¹F
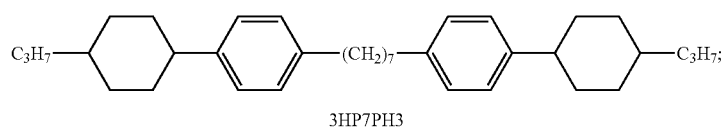
3HP7PH3
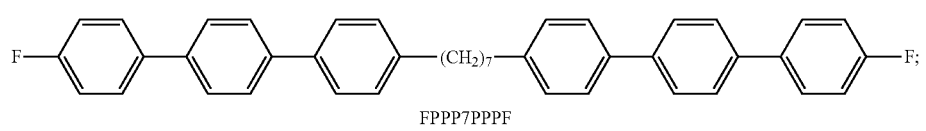
FPPP7PPPF
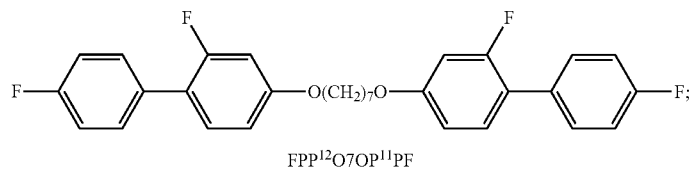
FPP¹²O7OP¹¹PF
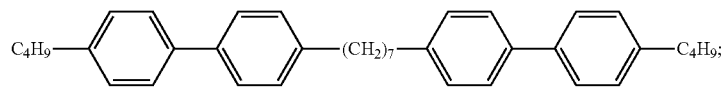
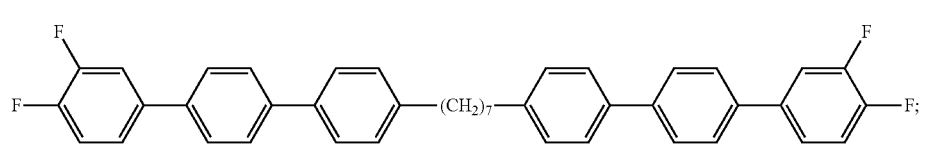
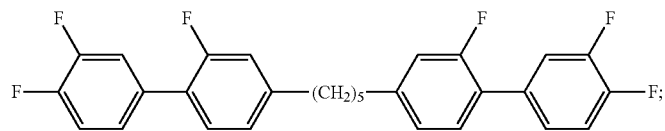
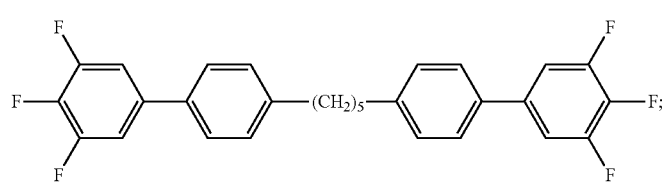
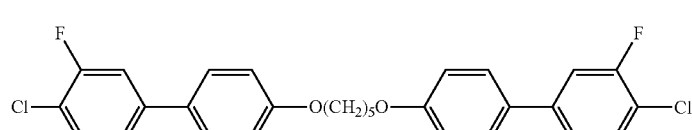
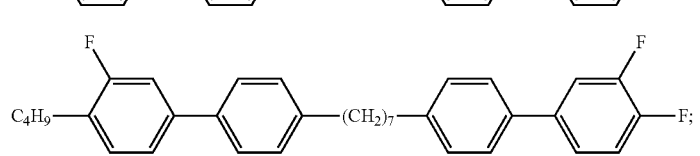

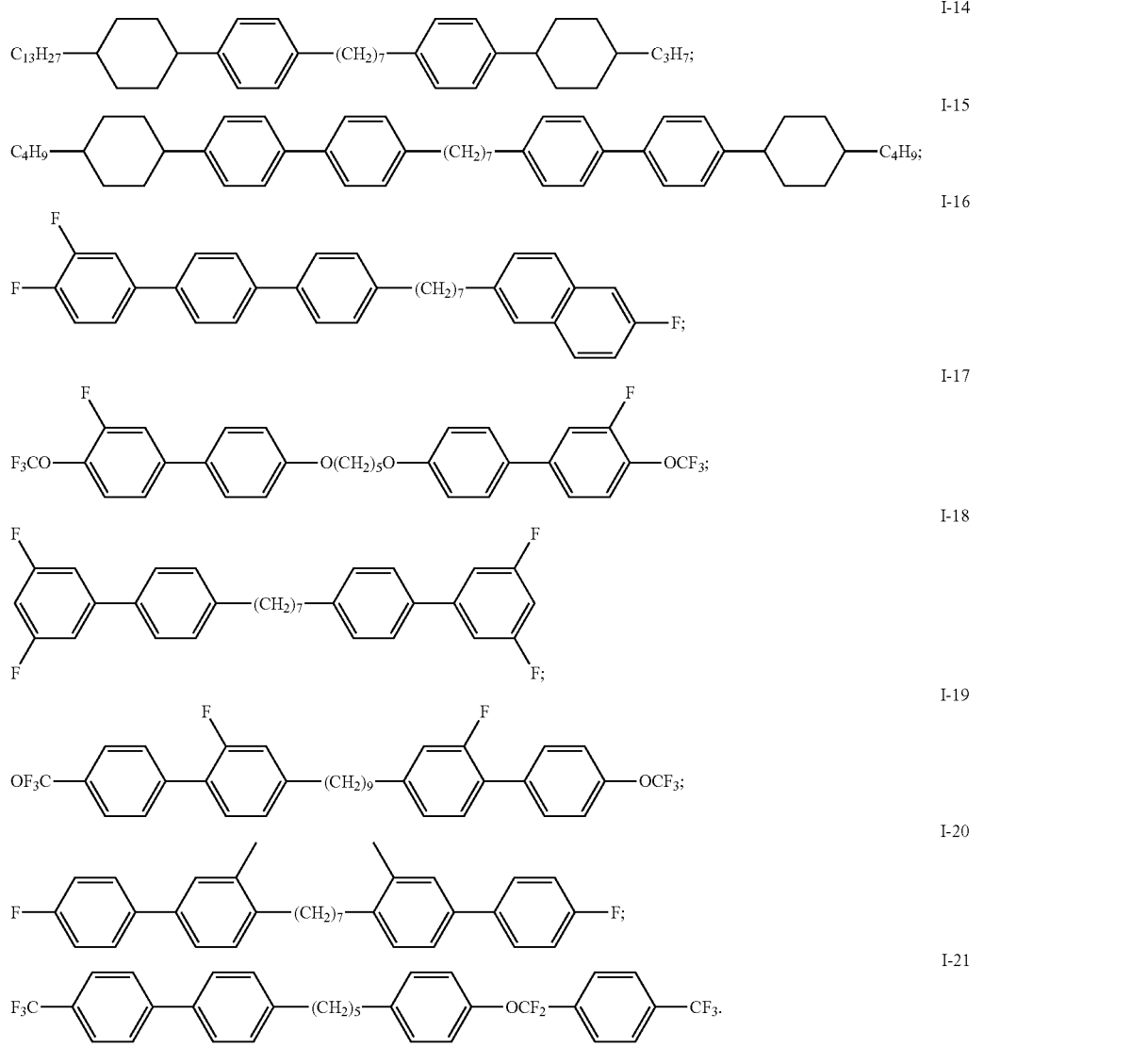
Preferably, the compound of formula II is selected from the group of compounds II-1 to II-24:
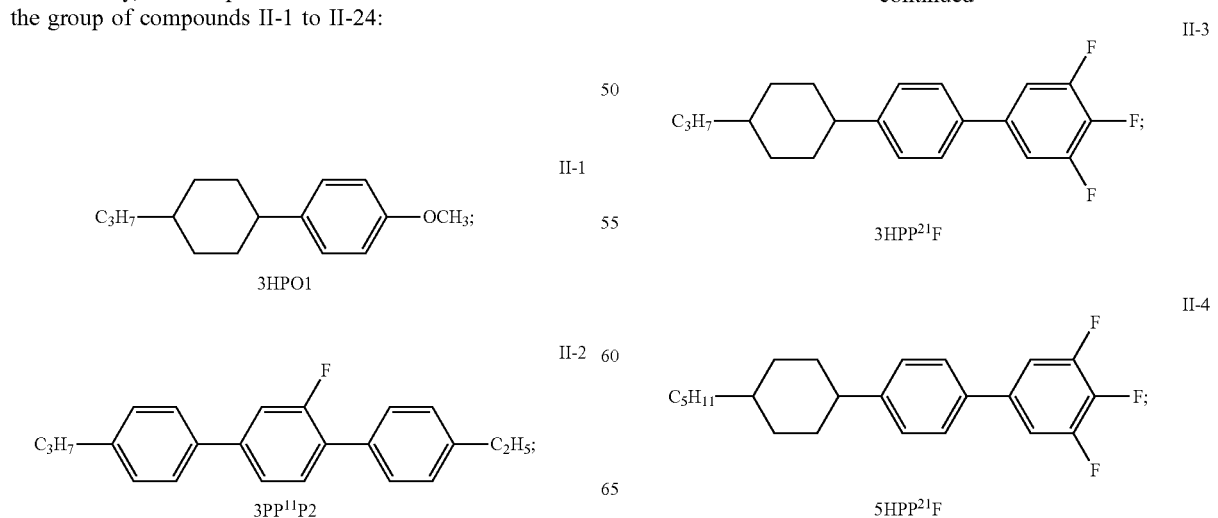

-continued
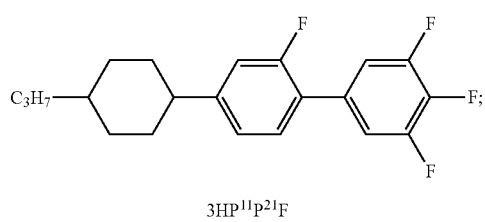
II-5
3HP^{11}P^{21}F
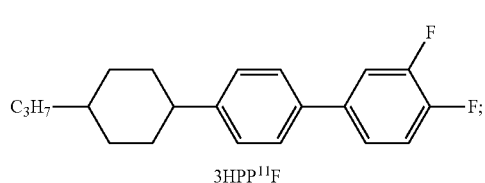
II-6
3HPP^{11}F
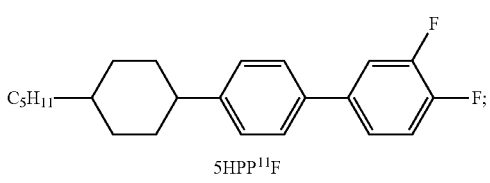
II-7
5HPP^{11}F
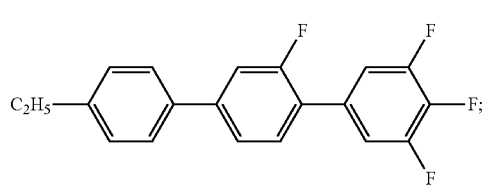
II-8
2PP^{11}P^{21}F
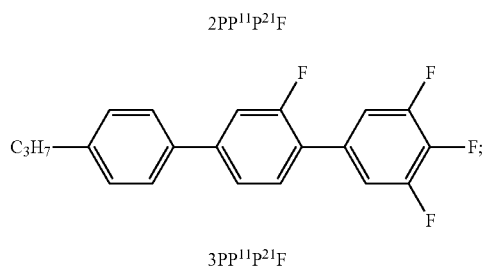
II-9
3PP^{11}P^{21}F
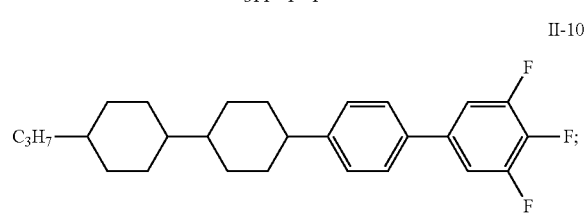
II-10
3HHPP^{21}F
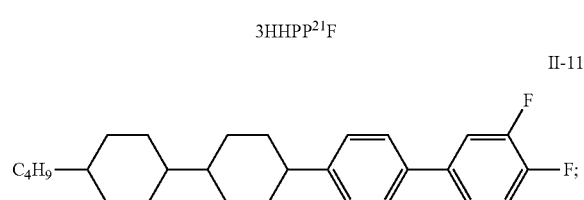
II-11
4HHPP^{21}F
-continued
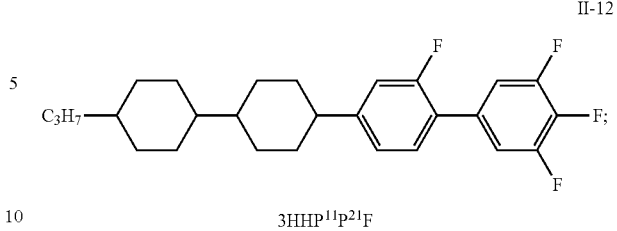
II-12
3HHP^{11}P^{21}F
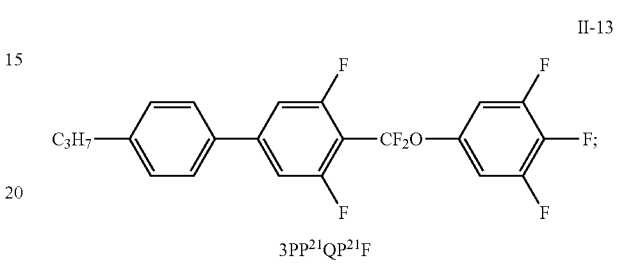
II-13
3PP^{21}QP^{21}F
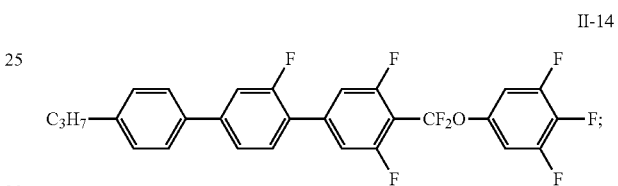
II-14
3PP^{11}P^{21}QP^{21}F
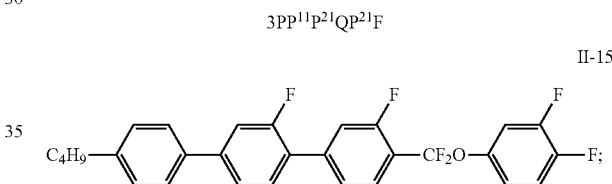
II-15
4PP^{11}P^{21}QP^{21}F
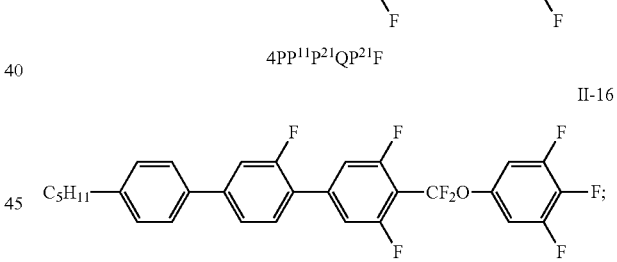
II-16
5PP^{11}P^{21}QP^{21}F
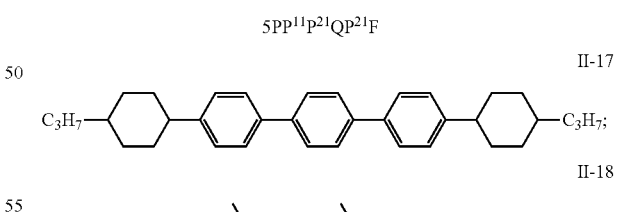
II-17
II-18
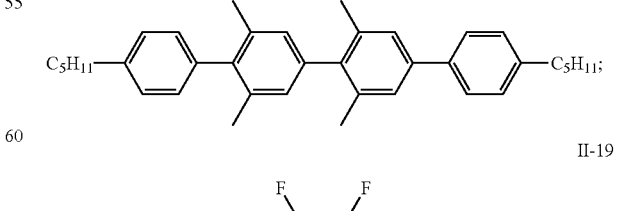
II-19

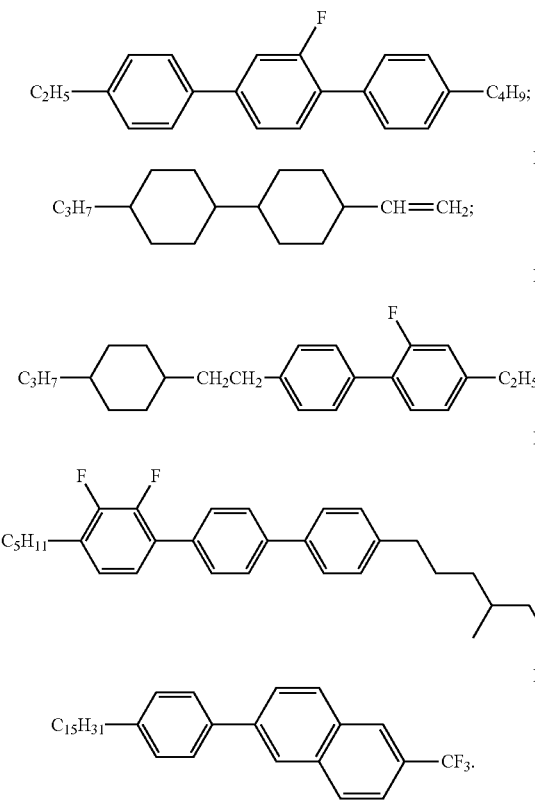

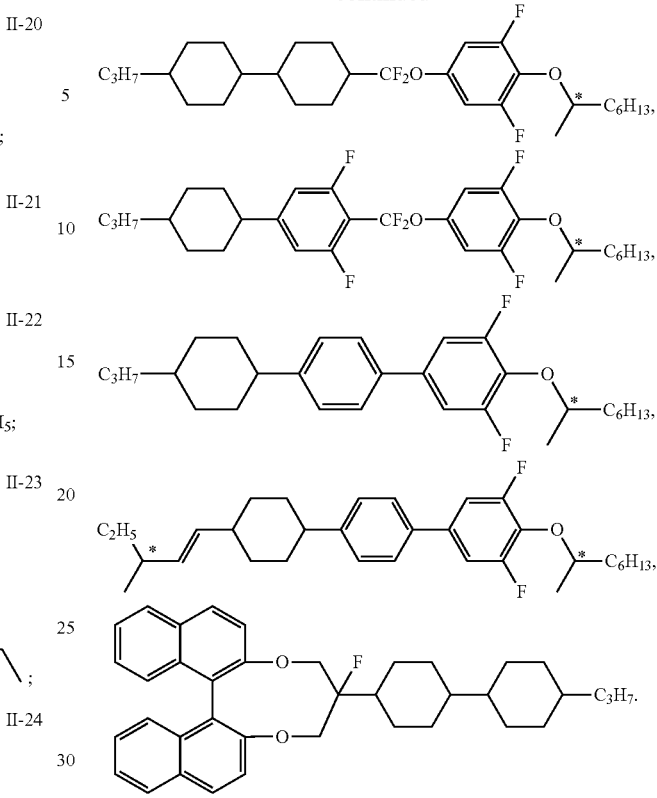

The chiral compounds can induce the spiral twisting of nematic liquid crystal molecules, forming chiral nematic liquid crystal (cholesteric liquid crystal). Preferably, the chiral compound is selected from the group of:

Generally, the liquid crystal mixture was prepared in accordance with the ratio specified in the following examples. The preparation is carried out in accordance with a conventional method in the art. In detail, each component is weighed according to its corresponding mass percentage, and placed in a glass bottle. After a magnetic stirring bar is added, the bottle is placed on a heating magnetic stirrer, and the liquid crystal mixture is heated and stirred until completely melting to form an isotropic transparent solution. The temperature at this point has reached the clear point of the liquid crystal mixture. If the liquid crystal mixture contains a light-sensitive compound, the liquid crystal mixture must be heated to the clear point in the dark. The liquid crystal mixture continues to be heat in the temperature for 30 minutes to ensure uniform mixing, and then the liquid crystal continues to be stirred for another 2 hours. In order to ensure sufficient and stable miscibility of the liquid crystal mixture, as well as, forming of liquid crystal state in an appropriate temperature range, the mass percentage of component B in the liquid crystal mixture should be more than 40%. Preferably, the mass percentage of the component B in the liquid crystal mixture is 40%-95%. The mass percentage of component A in the liquid crystal is 1%-60%. Preferably, the mass percentage of component A is 10%-50% in the liquid crystal mixture.

After that, the uniformly mixed liquid crystal mixture is poured into an empty liquid crystal cell prepared according to various design requirements by a vacuum-filled method, and then the cell is sealed by a UV adhesive, forming a light modulating device. The light modulating device has two stable states: a transparent state and a light scattering state. In the transparent state, the chiral nematic liquid crystal (cholesteric liquid crystal) molecules are substantially aligned parallel to the device substrate, and the helical axis thereof is perpendicular to the device substrate to form the planar texture of cholesteric liquid crystal. In this state, the incident light transmits through the light modulating device substantially unaffected. While in the light scattering state, the cholesteric liquid crystal molecules form a focal conic texture, and the incident light is substantially scattered, causing large haze. By selecting a suitable driving voltage, the light modulating device may be switched between the transparent state and the light scattering state, where the haze is measured using a WGT-S type haze meter to determine its optical performance.

The structure of the light modulating device is shown in FIG. 1, wherein the first transparent substrate 101 and the second transparent substrate 102 may be made of a hard material (such as transparent glass) or a flexible material (such as PET, PEN, PC, PP, PMMA, PBT, PVC, PI, cellulose, etc.). The invention is not limited to this, and other materials with light transmission conforming to the requirements may also be used. The liquid crystal layer 103 is disposed between the first transparent substrate 101 and the second transparent substrate 102, which contains the liquid crystal mixture. The first transparent electrode 104 is disposed between the first transparent substrate 101 and the liquid crystal layer 103, while the second transparent electrode 105 is disposed between the second transparent substrate 102 and the liquid crystal layer 103. Depending on its materials, the transparent electrodes may be classified into carbon-based conductive films, metallic nanowire conductive films, and metallic oxide conductive films. In the following examples, the materials of the first transparent electrode 104 and the second transparent electrode 105 is ITO. The thickness of the liquid crystal layer 103 is 5-60 micrometers.

Figure 2:
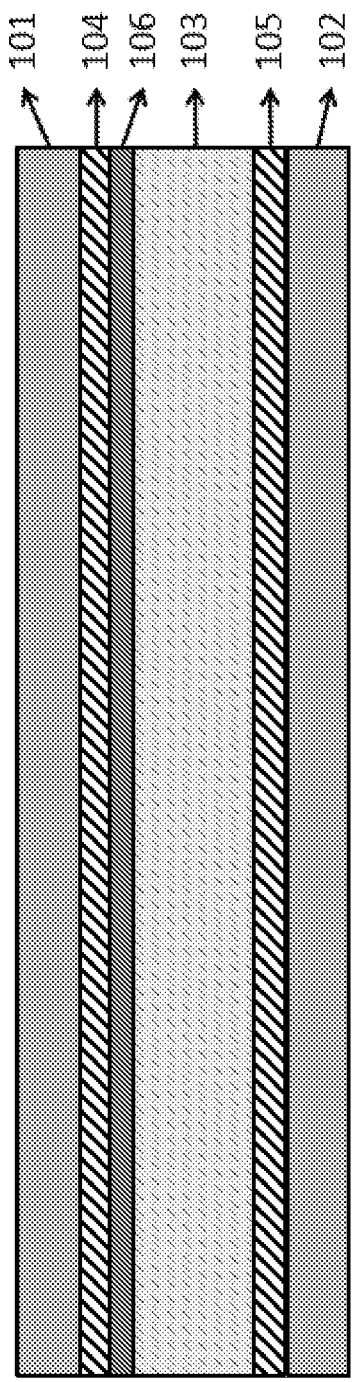
FIG. 2 is a schematic, illustrative view of the structure of the light modulating device according to another embodiment.
Figure 3:
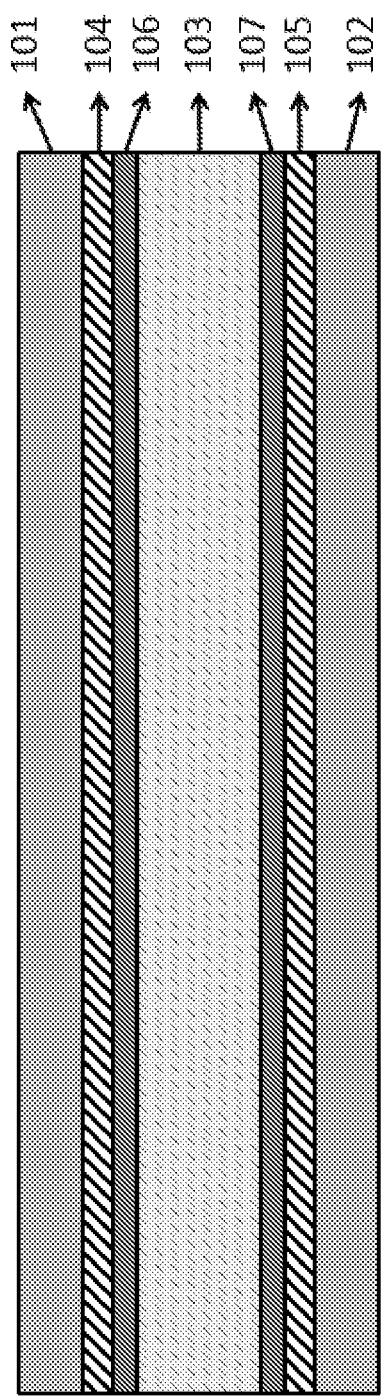
FIG. 3 is a schematic, illustrative view of the structure of the light modulating device according to another embodiment.

In some embodiments, a first alignment layer 106 may be disposed between the first transparent electrode 104 and the liquid crystal layer 103, as shown in FIG. 2. The alignment layer 106 serves to align the liquid crystal molecules in the liquid crystal layer 103 in a predetermined pattern. In some embodiments, as shown in FIG. 3, a second alignment layer 107 may be further disposed between the second transparent electrode 105 and the liquid crystal layer 103. Depending on the pretilt angle (i.e. the angle between the long axis of the liquid crystal molecules and the surface of the alignment layer when the liquid crystal molecules are sequentially arranged on the surface of the alignment layer), the alignment layer can be classified into homogenous alignment where the long axis is substantially parallel to the surface, such as IPS, TN or STN type, or heterogeneous alignment where the long axis is substantially vertical to the surface, such as VA type.

Under the external environment (such as long-term UV exposure, extreme temperature changes, exposure to moisture or dust, etc.), the liquid crystal materials are easy to decompose and release ions. Excessive ion charges will reduce the voltage holding rate (VHR) and resistivity of the liquid crystal materials, therefore affecting the electro-optic performance. Meanwhile, excessive ion charges are accumulated on the contact surface between the liquid crystal layer and the alignment layer, causing the effective voltage applied on the liquid crystal molecules decreases with the accumulation of ion charges. As a result, the liquid crystal molecules cannot be rapidly rotated in the moment of voltage switching, affecting the stability and uniformity of optical performance of the light modulating device. In the following examples, the stability of electrical performance of the liquid crystal mixture is revealed by measuring the drop in resistivity of the liquid crystal mixture. The resistivity is measured in the initial state, after UV irradiation (wavelength: 365 nm, light intensity: 85 mW/cm$^2$, exposure time: 1 hour) and after heat treatment (temperature: 150° C., time: 1 hour). The instrument used in the measurements is INSTEC ALCR-HR1 resistance meter.

In the following examples, the component of the liquid crystal mixture, the optical performance of the light modulating device and the stability of electrical performance of the liquid crystal mixture will be described in detail. The first transparent substrate 101 and the second transparent substrate 102 in the following examples are transparent glasses, and the first transparent electrode 104 and the second transparent electrode 105 are ITO. There are two alignment layer which are both VA type.

In the following examples, the group structures of the liquid crystal molecules are represented by the codes listed in Table 1, and the codes and structures of component C are listed in Table 2. The ratios all refer to mass percentages.

TABLE 1 the code for groups of liquid crystal

| Code | Group structure |
|---|---|
| H | cyclohexylene |
| O | —O— |
| P | 1,4-phenylene |
| P$^{11}$ | 2-fluoro-1,4-phenylene (F at position 1) |
| P$^{12}$ | 3-fluoro-1,4-phenylene (F at position 2) |
| P$^{21}$ | 2,3-difluoro-1,4-phenylene |
| R$^{22}$ | 2,5-difluoro-1,4-phenylene |
| Q | —CF2O— |
| F | —F |
| N | —CN |

TABLE 1-continued the code for groups of liquid crystal

| Code | Group structure |
|---|---|
| E | 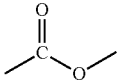 |
| n | $-C_nH_{2n+1}$ or $-C_nH_{2n}-$ | where, if n=3, the group is $-C_3H_7$ (at the end of formula) or $-C_3H_6-$ (in the middle of formula).

TABLE 2

The code and structure of other additives

| Code | Structure |
|---|---|
| L-4 | 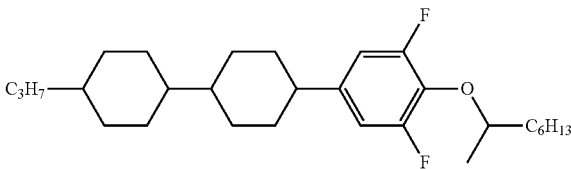 |
| R05 | 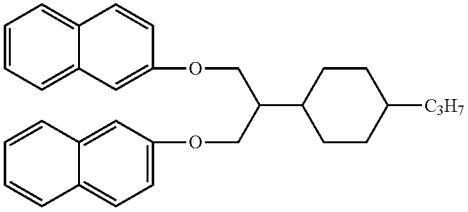 |

COMPARATIVE EXAMPLE

TABLE 3 formula of liquid crystal mixture

| Component | Ratio/% |
|---|---|
| 5PPN | 20.0 |
| 3PP11PN | 16.0 |
| 2PPN | 7.0 |
| 5HPPN | 9.0 |
| 5PPPN | 4.0 |
| 5OPPN | 16.0 |
| 6OPPN | 8.0 |
| 4PEP11N | 15.0 |
| L04 | 5.0 |
| Total | 100 |

TABLE 4 optical performance data for the light modulating device and electrical performance data for the liquid crystal mixture

| Optical performance | | Electrical performance Resistivity ($10^{12}$ Ω-cm) | | | |
|---|---|---|---|---|---|
| Cell gap/μm | 20 | Initial state | 0.260 | Initial state | 0.150 |
| Haze in the transparent state/% | 48.0 | After UV irradiation | 0.004 | After heating treatment | 0.006 |

TABLE 4-continued optical performance data for the light modulating device and electrical performance data for the liquid crystal mixture

| Optical performance | | Electrical performance Resistivity ($10^{12}$ Ω-cm) | | | |
|---|---|---|---|---|---|
| Haze in the light scattering state/% | 79.7 | Drop | 98.46% | Drop | 96.00% |

Example 1

TABLE 5 formula of liquid crystal mixture

| | Component | Ratio/% |
|---|---|---|
| Component A | FP12P9PP11F | 15.0 |
| Component B | 3PP11P2 | 4.0 |
| | 3HPP21F | 4.0 |
| | 5HPP21F | 8.0 |
| | 3HPP11F | 4.0 |
| | 5HPP11F | 4.0 |
| | 3PP11P21F | 8.0 |
| | 3HHPP21F | 8.0 |
| | 3HHP11P21F | 8.0 |
| | 3PP21QP21F | 8.0 |
| | 3PP11P21QP21F | 8.0 |
| | 4PP11P21QP21F | 8.0 |
| | 5PP11P21QP21F | 8.0 |
| Component C | L04 | 5.0 |
| | Total | 100 |

TABLE 6 optical performance data for the light modulating device and electrical performance data for the liquid crystal mixture

| Optical performance | | Electrical performance Resistivity ($10^{12}$ Ω-cm) | | |
|---|---|---|---|---|
| Cell gap/μm | 20 | Initial state | 11.33 | Initial state 10.97 |
| Haze in the transparent state/% | 7.6 | After UV irradiation | 4.69 | After heating treatment 5.31 |
| Haze in the light scattering state/% | 78.2 | Drop | 58.61% | Drop 51.60% |

Example 2

TABLE 7 formula of liquid crystal mixture

| | Component | Ratio/% |
|---|---|---|
| Component A | $FP^{12}P7PP^{11}F$ | 29.9 |
| Component B | 3HPO1 | 1.2 |
| | $3PP^{11}P2$ | 3.1 |
| | $3HPP^{21}F$ | 4.3 |
| | $5HPP^{21}F$ | 7.9 |
| | $2PP^{11}p^{21}F$ | 2.4 |
| | $3PP^{11}p^{21}F$ | 6.1 |
| | $3HHPP^{21}F$ | 4.9 |
| | $3HHP^{11}p^{21}F$ | 1.8 |
| | $3PP^{11}p^{21}QP^{21}F$ | 9.8 |
| | $4PP^{11}p^{21}QP^{21}F$ | 9.8 |
| | $5PP^{11}p^{21}QP^{2/}F$ | 9.8 |
| Component C | L04 | 9.0 |
| | Total | 100 |

TABLE 8 optical performance data for the light modulating device and electrical performance data for the liquid crystal mixture

| Optical performance | | Electrical performance Resistivity ($10^{12}$ Ω-cm) | | |
|---|---|---|---|---|
| Cell gap/μm | 20 | Initial state | 11.80 | Initial state 11.44 |
| Haze in the transparent state/% | 0.8 | After UV irradiation | 6.20 | After heating treatment 6.27 |
| Haze in the light scattering state/% | 75.3 | Drop | 47.46% | Drop 45.19% |

Example 3

TABLE 9 formula of liquid crystal mixture

| | Component | Ratio/% |
|---|---|---|
| Component A | $FP^{12}P7PP^{11}F$ | 29.0 |
| | $FPP^{12}O7OP^{11}PF$ | 1.0 |
| Component B | $3PP^{11}P2$ | 3.3 |
| | $3HPP^{21}F$ | 3.3 |
| | $5HPP^{21}F$ | 6.5 |
| | $3HP^{11}p^{21}F$ | 3.3 |
| | $3HPP^{11}F$ | 3.3 |
| | $3PP^{11}p^{21}F$ | 5.2 |
| | $3HHPP^{21}F$ | 6.5 |
| | $4HHPP^{21}F$ | 6.5 |
| | $3PP^{21}QP^{21}F$ | 6.5 |
| | $3PP^{11}p^{21}QP^{21}F$ | 7.6 |
| | $4PP^{11}p^{21}QP^{21}F$ | 6.5 |
| | $5PP^{11}p^{21}QP^{21}F$ | 6.5 |
| Component C | L04 | 5.0 |
| | Total | 100 |

TABLE 10 optical performance data for the light modulating device and electrical performance data for the liquid crystal mixture

| Optical performance | | Electrical performance Resistivity ($10^{12}$ Ω-cm) | | |
|---|---|---|---|---|
| Cell gap/μm | 20 | Initial state | 13.70 | Initial state 12.99 |
| Haze in the transparent state/% | 1.2 | After UV irradiation | 6.59 | After heating treatment 6.86 |
| Haze in the light scattering state/% | 79.9 | Drop | 51.90% | Drop 47.19% |

Example 4 formula of liquid crystal mixture

| | Component | Ratio/% |
|---|---|---|
| Component A | $FP^{12}P7PP^{11}F$ | 10.0 |
| | $FP^{12}P9PP^{11}F$ | 10.0 |
| | $FP^{12}P11PP^{11}F$ | 10.0 |
| Component B | $3PP^{11}P2$ | 3.3 |
| | $3HPP^{21}F$ | 3.3 |
| | $5HPP^{21}F$ | 6.5 |
| | $3HPP^{11}F$ | 3.2 |
| | $5HPP^{11}F$ | 3.2 |
| | $3PP^{11}p^{21}F$ | 6.5 |
| | $3HHPP^{21}F$ | 6.5 |
| | $3HHP^{11}p^{21}F$ | 6.5 |
| | $3PP^{21}QP^{21}F$ | 6.5 |
| | $3PP^{11}p^{21}QP^{21}F$ | 6.5 |
| | $4PP^{11}p^{21}QP^{21}F$ | 6.5 |
| | $5PP^{11}p^{21}QP^{21}F$ | 6.5 |
| Component C | L04 | 5.0 |
| | Total | 100 |

TABLE 12 optical performance data for the light modulating device and electrical performance data for the liquid crystal mixture

| Optical performance | | Electrical performance Resistivity ($10^{12}$ Ω-cm) | | |
|---|---|---|---|---|
| Cell gap/μm | 50 | Initial state | 12.50 | Initial state 13.08 |
| Haze in the transparent state/% | 5.7 | After UV irradiation | 5.93 | After heating treatment 6.89 |
| Haze in the light scattering state/% | 91.2 | Drop | 52.56% | Drop 47.32% |

Example 5

TABLE 13 formula of liquid crystal mixture

| | Component | Ratio/% |
|---|---|---|
| Component A | $FP^{12}P7PP^{11}F$ | 28.0 |
| | 3HP7PH3 | 1.0 |
| | FPPP7PPPF | 1.0 |
| Component B | $3PP^{11}P2$ | 3.3 |
| | $3HPP^{21}F$ | 3.3 |
| | $5HPP^{21}F$ | 6.5 |
| | $3HPP^{11}F$ | 3.2 |
| | $5HPP^{11}F$ | 3.2 |
| | $3PP^{11}P^{21}F$ | 6.5 |
| | $3HHPP^{21}F$ | 6.5 |
| | $3HHP^{11}P^{21}F$ | 6.5 |
| | $3PP^{21}QP^{21}F$ | 6.5 |
| | $3PP^{11}P^{21}QP^{21}F$ | 6.5 |
| | $4PP^{11}P^{21}QP^{21}F$ | 6.5 |
| | $5PP^{11}P^{21}QP^{21}F$ | 6.5 |
| Component C | L04 | 5.0 |
| | Total | 100 |

TABLE 14 optical performance data for the light modulating device and electrical performance data for the liquid crystal mixture

| Optical performance | | | | Electrical performance Resistivity ($10^{12}$ Ω-cm) | |
|---|---|---|---|---|---|
| Cell gap/μm | 20 | Initial state | 13.40 | Initial state | 12.57 |
| Haze in the transparent state/% | 6.1 | After UV irradiation | 6.54 | After heating treatment | 6.32 |
| Haze in the light scattering state/% | 78.8 | Drop | 51.19% | Drop | 49.72% |

Example 6

TABLE 15 formula of liquid crystal mixture

| | Component | Ratio/% |
|---|---|---|
| Component A | $FP^{12}P7PP^{11}F$ | 30.0 |
| | $FP^{12}P9PP^{11}F$ | 5.0 |
| Component B | $3PP^{11}P2$ | 3.0 |
| | $3HPP^{21}F$ | 3.0 |
| | $5HPP^{21}F$ | 6.5 |
| | $3HPP^{11}F$ | 3.0 |
| | $5HPP^{11}F$ | 3.0 |
| | $3PP^{11}P^{21}F$ | 6.5 |
| | $3HHPP^{21}F$ | 6.5 |
| | $3HHP^{11}P^{21}F$ | 6.5 |
| | $3PP^{21}QP^{21}F$ | 6.5 |
| | $3PP^{11}P^{21}QP^{21}F$ | 6.5 |
| | $4PP^{11}P^{21}QP^{21}F$ | 6.5 |
| | $5PP^{11}P^{21}QP^{21}F$ | 6.5 |
| Component C | R05 | 1.0 |
| | Total | 100 |

TABLE 4 optical performance data for the light modulating device and electrical performance data for the liquid crystal mixture

| Optical performance | | | | Electrical performance Resistivity ($10^{12}$ Ω-cm) | |
|---|---|---|---|---|---|
| Cell gap/μm | 20 | Initial state | 12.90 | Initial state | 11.94 |
| Haze in the transparent state/% | 1.1 | After UV irradiation | 6.01 | After heating treatment | 6.23 |
| Haze in the light scattering state/% | 75.8 | Drop | 53.41% | Drop | 47.82% |

Example 7

TABLE 17 formula of liquid crystal mixture

| | Component | Ratio/% |
|---|---|---|
| Component A | $FP^{12}P7PP^{11}F$ | 30.0 |
| | $FP^{12}P11PP^{11}F$ | 10.0 |
| Component B | $3PP_{11}P2$ | 2.8 |
| | $3HPP^{21}F$ | 2.8 |
| | $5HPP^{21}F$ | 5.5 |
| | $3HPP^{11}F$ | 2.7 |
| | $5HPP^{11}F$ | 2.7 |
| | $3PP^{11}P^{21}F$ | 5.5 |
| | $3HHPP^{21}F$ | 5.5 |
| | $3HHP^{11}P^{21}F$ | 5.5 |
| | $3PP^{21}QP^{21}F$ | 5.5 |
| | $3PP^{11}P^{21}QP^{21}F$ | 5.5 |
| | $4PP^{11}P^{21}QP^{21}F$ | 5.5 |
| | $5PP^{11}P^{21}QP^{21}F$ | 5.5 |
| Component C | L04 | 5.0 |
| | Total | 100 |

TABLE 18 optical performance data for the light modulating device and electrical performance data for the liquid crystal mixture

| Optical performance | | | | Electrical performance Resistivity ($10^{12}$ Ω-cm) | |
|---|---|---|---|---|---|
| Cell gap/μm | 20 | Initial state | 11.70 | Initial state | 11.32 |
| Haze in the transparent state/% | 1.0 | After UV irradiation | 6.05 | After heating treatment | 6.07 |
| Haze in the light scattering state/% | 68.8 | Drop | 48.29% | Drop | 46.38% |

From the above examples and comparative example, it is demonstrated that the light modulating device containing the liquid crystal mixture of the present invention has a significantly low haze in the transparent state and an ultra-high haze in the light scattering state, thereby providing high light transmittance while keeping sufficient privacy and isolation. Meanwhile, After UV irradiation or heating treatment, the drop degree of resistivity in examples 1-7 is significantly smaller than that in the comparative example, indicating stability of electrical performance of the liquid crystal mixture in examples 1-7 is improved.

While several particular exemplary embodiments have been described above in detail, the disclosed embodiments are considered illustrative rather than limiting. Those skilled in the art will readily realize that alternatives, modifications, variations, improvements, and substantial equivalents are possible without substantially departing from the novelty spirits or scope of the present disclosure. Thus, all such alternatives, modifications, variations, improvements, and substantial equivalents are intended to be embraced within the scope of the present disclosure as defined by the appended claims.

INDUSTRIAL APPLICABILITY

The liquid crystal mixture of the present invention can be applied to the field of liquid crystal.

The invention claimed is:
1. A liquid crystal mixture applied in light modulating devices, comprising:
(a) component A comprised of at least one compound of the following formula:

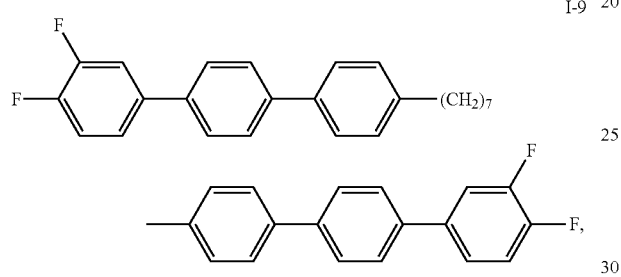
I-9 and
additionally one or more compounds selected from a group consisting of the following compounds of:

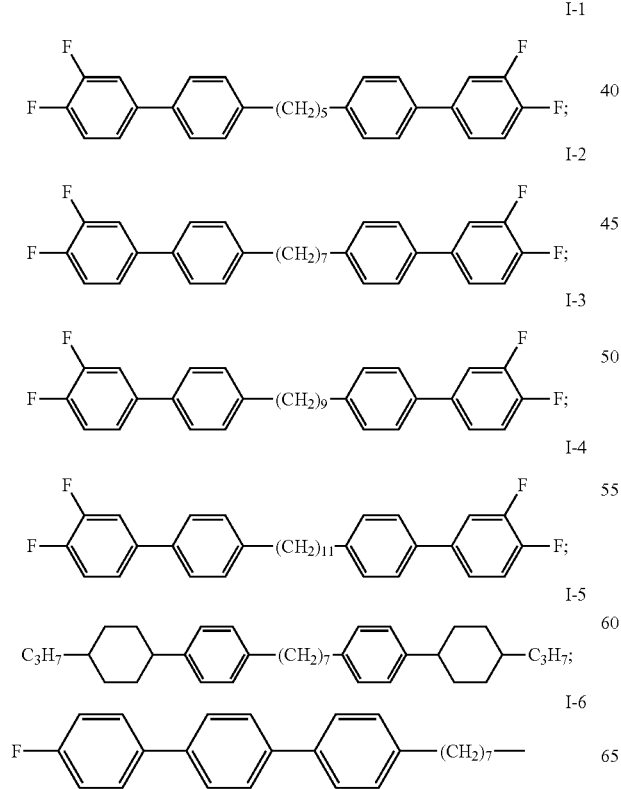
I-1
I-2
I-3
I-4
I-5
I-6

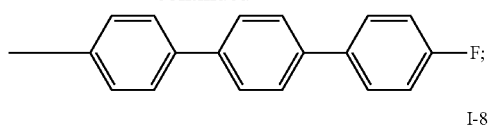
I-8

(b) component B comprised of one or more compounds selected from a group consisting of the following compounds:

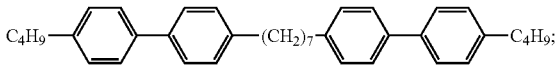
II-1

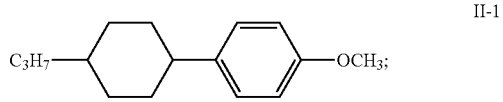
II-2

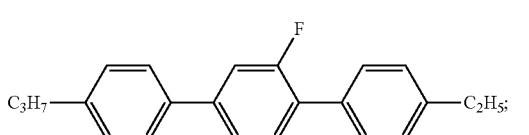
II-3

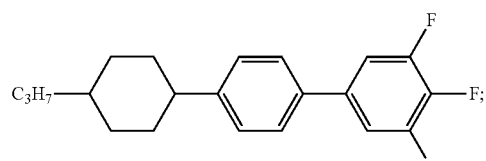
II-4

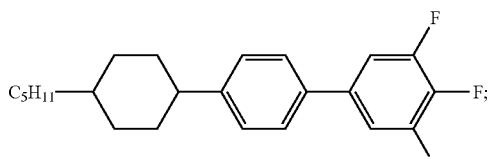
II-5

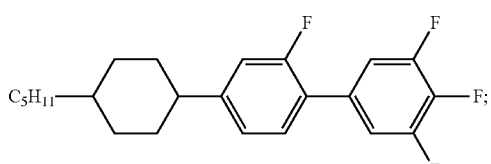
II-6

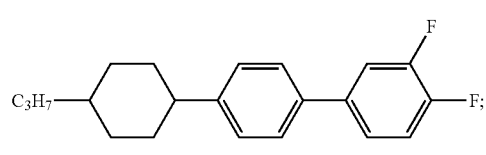
II-7

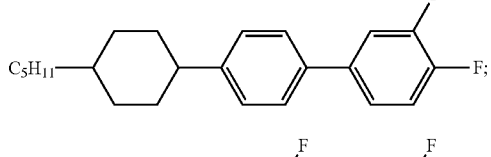
II-8

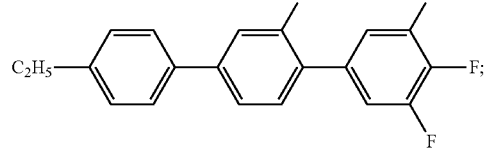

-continued
II-9
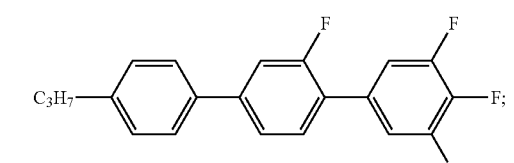
II-10
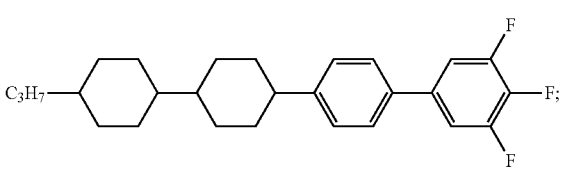
II-11
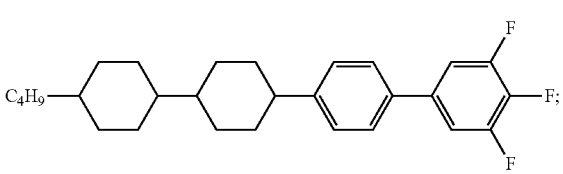
II-12
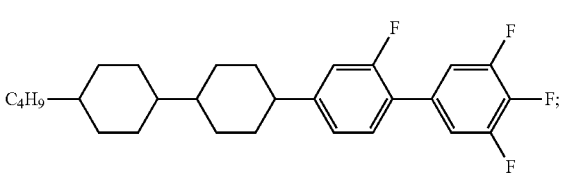
II-13
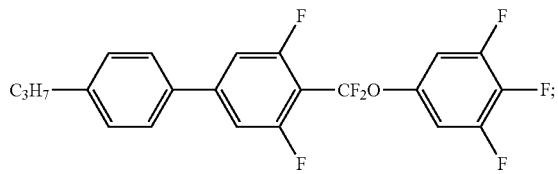
II-14
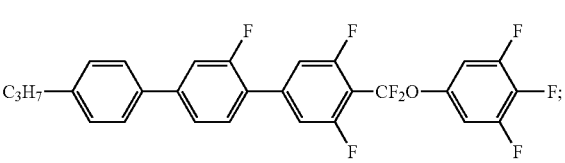
II-15
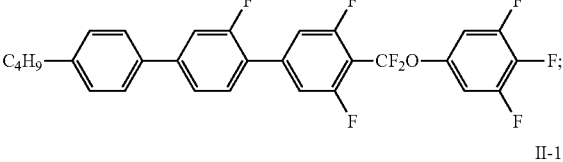
II-16
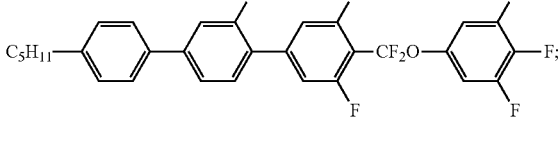
II-21
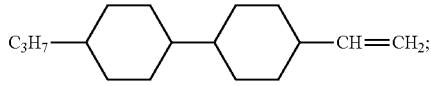
and
(c) component C comprised of one or more chiral compounds.
2. The liquid crystal mixture as defined in claim 1, wherein the component B is more than 40% by weight of the liquid crystal mixture.
3. The liquid crystal mixture as defined in claim 1, wherein the one or more chiral compounds is selected from the group of
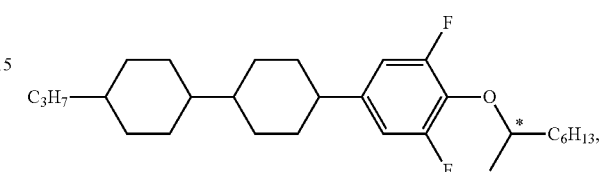
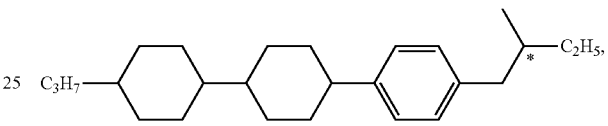
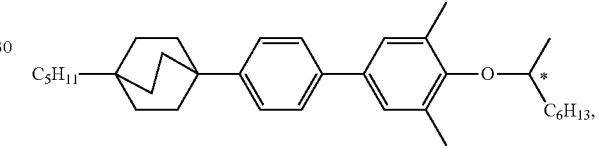
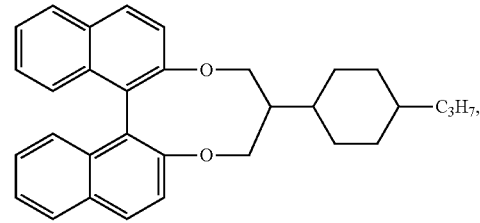
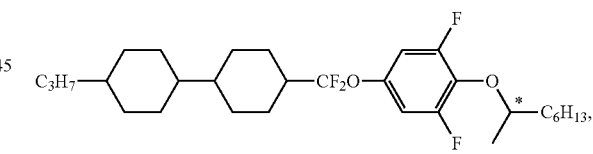
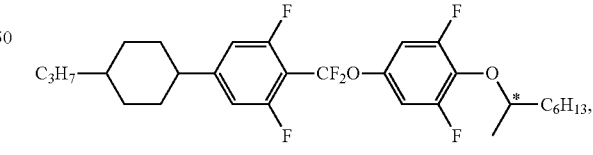
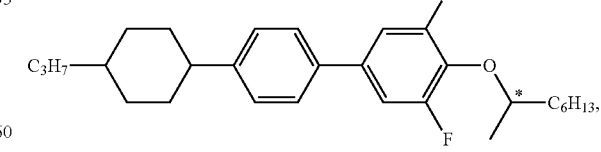
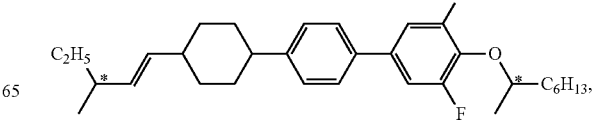

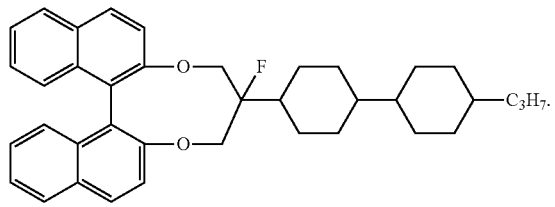

4. A light modulating device comprising the liquid crystal mixture as defined in claim 1, including two stable states: a transparent state where substantially all incident light goes through and a light scattering state where substantially all incident light is scattered.

5. The light modulating device as defined in claim 4, wherein the component A is from 1% to 60% by weight of the liquid crystal mixture.

6. A liquid crystal mixture applied in light modulating devices, comprising:
(a) component A comprised of one or more compounds selected from a group consisting of the following compounds of:

(b) component B comprised of one or more compounds selected from a group consisting of the following compounds:

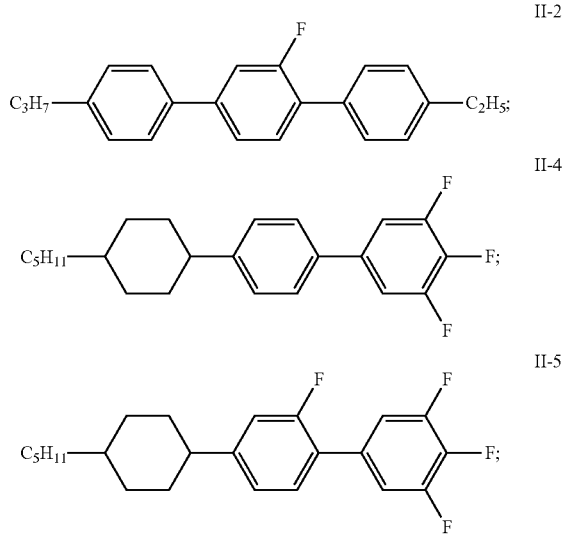

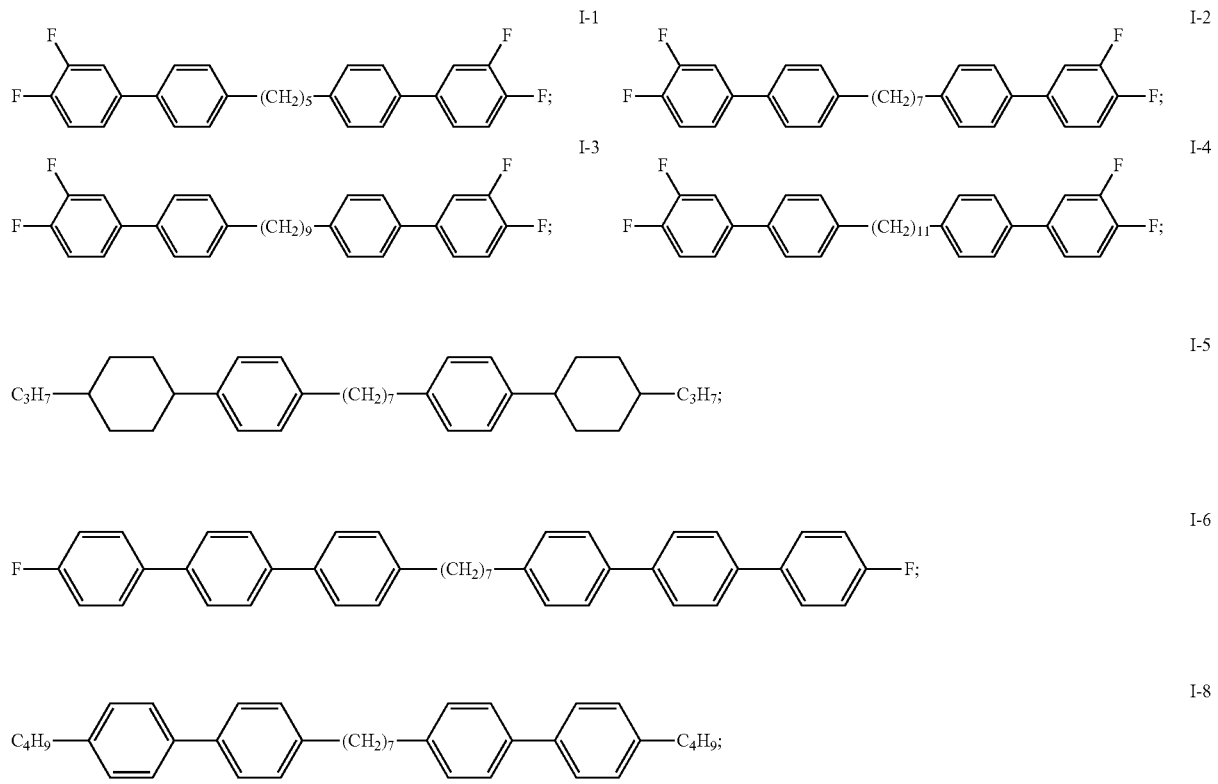

-continued

II-8
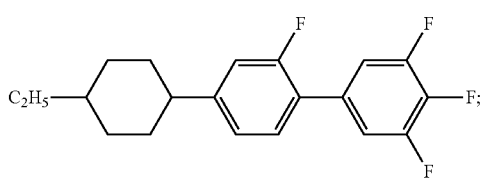

II-9
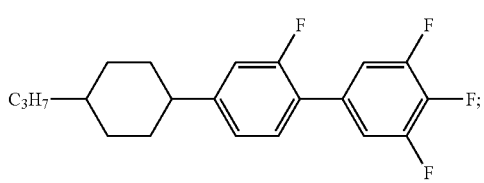

II-10
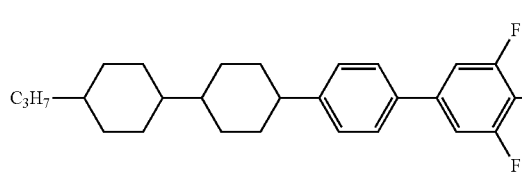

II-11
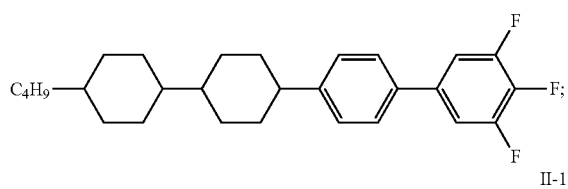

II-12
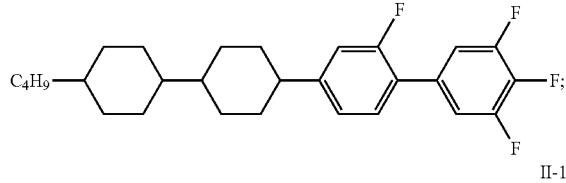

II-14
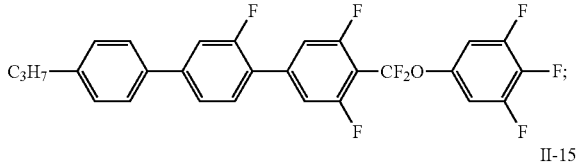

II-15
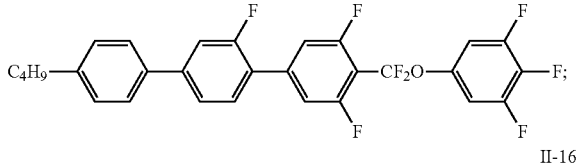

II-16
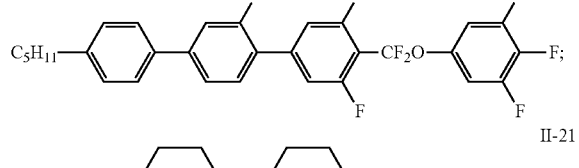

II-21
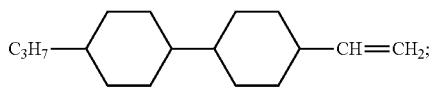

and (c) component C comprised of one or more chiral compounds.

7. The liquid crystal mixture as defined in claim 6, wherein the component B is more than 40% by weight of the liquid crystal mixture.

8. The liquid crystal mixture as defined in claim 6, wherein the one or more chiral compounds is selected from the group of

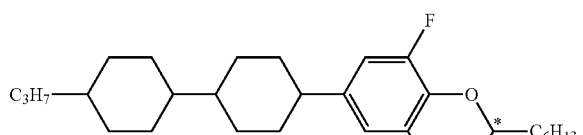

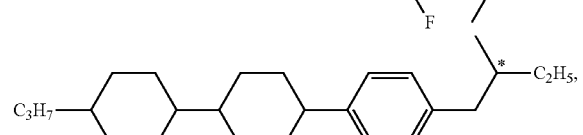

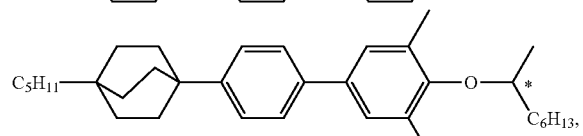

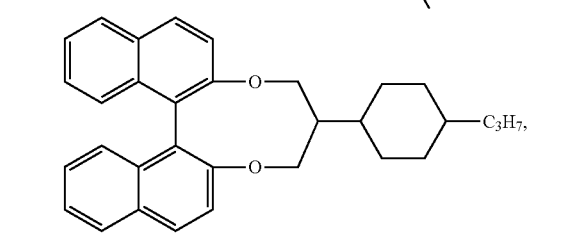

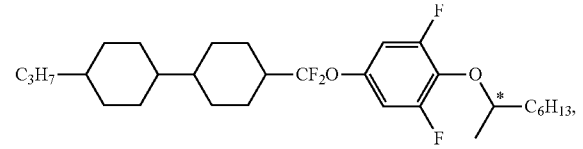

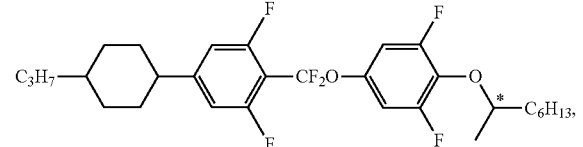

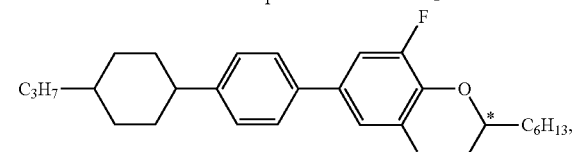

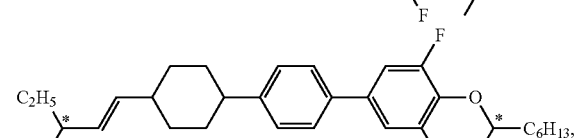

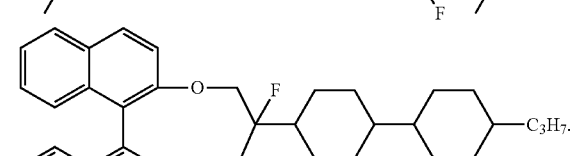

9. A light modulating device comprising the liquid crystal mixture as defined in claim 6, including two stable states: a transparent state where substantially all incident light goes through and a light scattering state where substantially all incident light is scattered.

10. The light modulating device as defined in claim 9, wherein the component A is from 1% to 60% by weight of the liquid crystal mixture.

11. A liquid crystal mixture applied in light modulating devices, comprising:
  (a) component A comprised of at least one compound of the following formula:

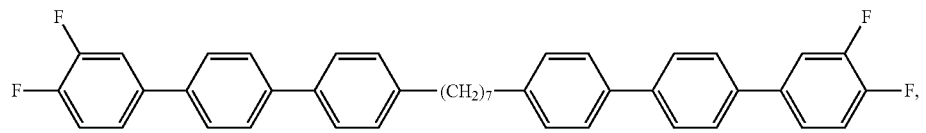
I-9 and
  additionally one or more compounds selected from a group consisting of the following compounds of:

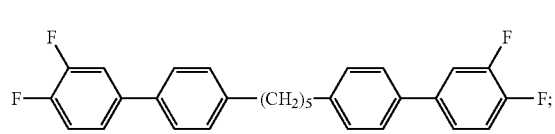
I-1

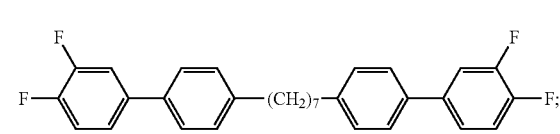
I-2

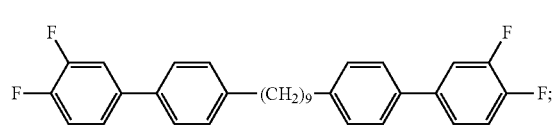
I-3

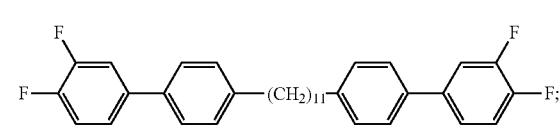
I-4

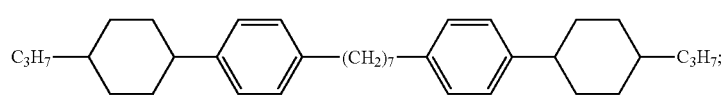
I-5

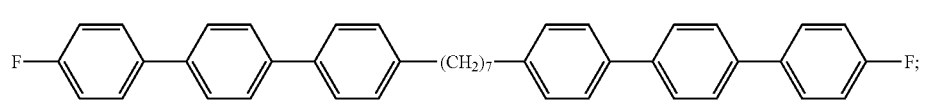
I-6

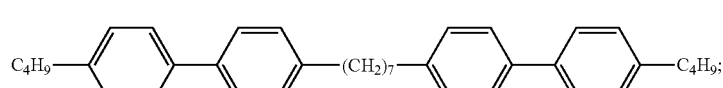
I-8 and
  (b) component B comprised of one or more compounds selected from a group consisting of the following compounds:

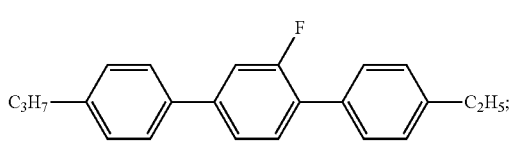
II-2

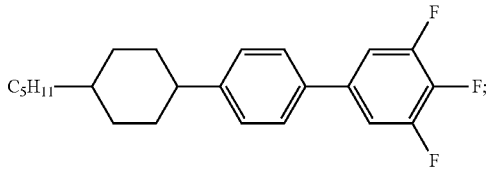
II-4

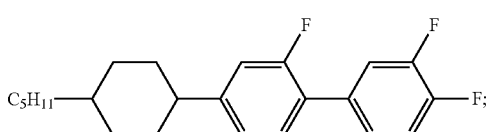
II-5

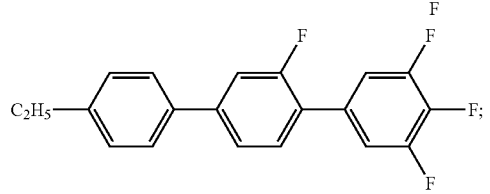
II-8

-continued

II-9
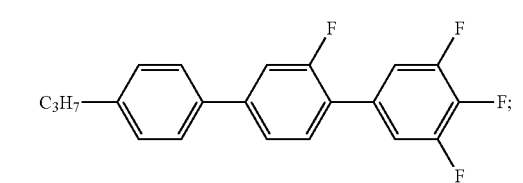

II-10
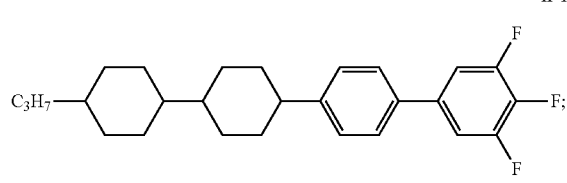

II-11
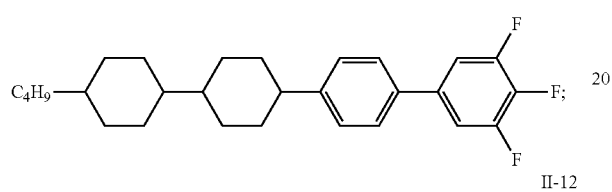

II-12
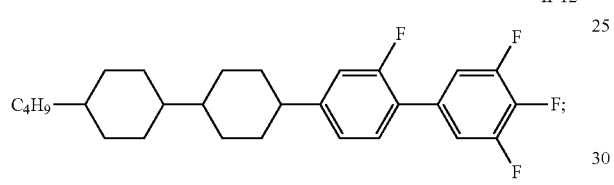

II-14
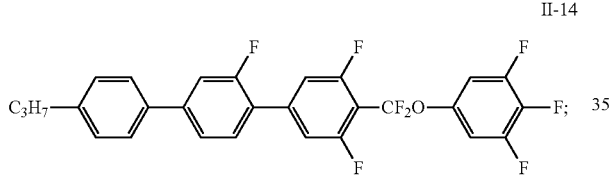

II-15
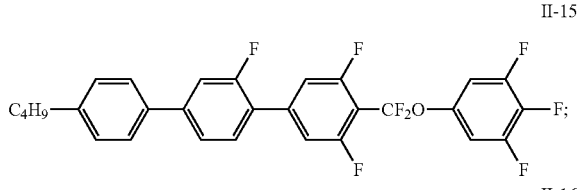

II-16
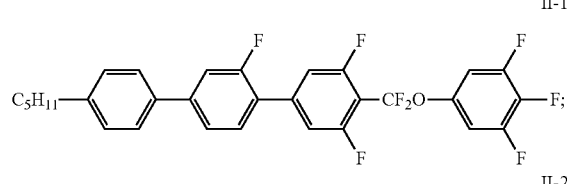

II-21
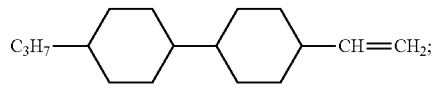

and (c) component C comprised of one or more chiral compounds.

12. The liquid crystal mixture as defined in claim 11, wherein the component B is more than 40% by weight of the liquid crystal mixture.

13. The liquid crystal mixture as defined in claim 11, wherein the one or more chiral compounds is selected from the group of

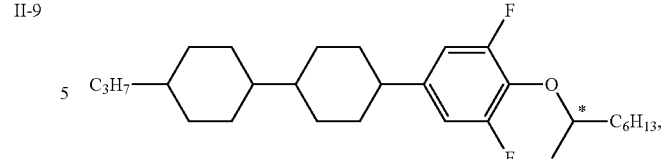

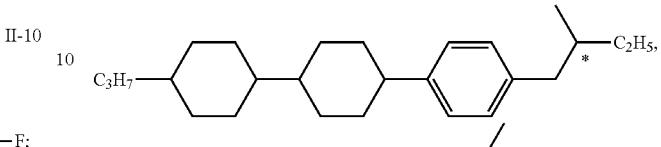

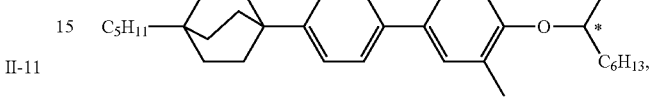

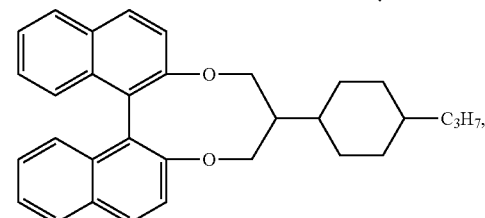

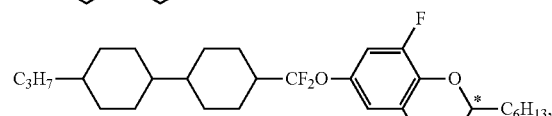

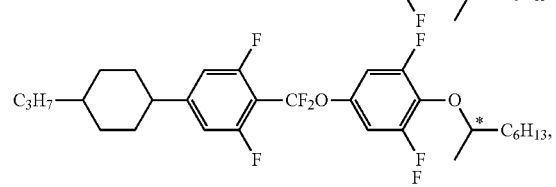

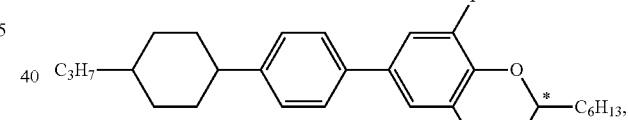

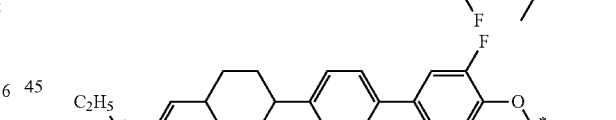

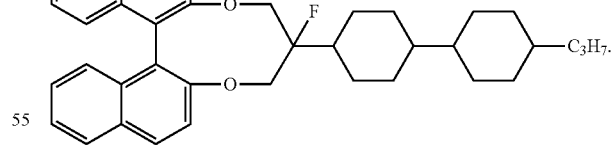

14. A light modulating device comprising the liquid crystal mixture as defined in claim 11, including two stable states: a transparent state where substantially all incident light goes through and a light scattering state where substantially all incident light is scattered.

15. The light modulating device as defined in claim 14, wherein the component A is from 1% to 60% by weight of the liquid crystal mixture.

* * * * *